United States Patent
Reynolds et al.

(10) Patent No.: US 8,736,458 B2
(45) Date of Patent: May 27, 2014

(54) WEIGH-IN-MOTION SCALE

(75) Inventors: William R. Reynolds, Hancock, MI (US); James E. Hertel, Houghton, MI (US); Keith R. Rutkowski, Dollar Bay, MI (US)

(73) Assignee: Signature Research, Inc., Calumet, MI (US)

( * ) Notice: Subject to any disclaimer, the term of this patent is extended or adjusted under 35 U.S.C. 154(b) by 354 days.

(21) Appl. No.: 13/094,336

(22) Filed: Apr. 26, 2011

(65) Prior Publication Data

US 2011/0267200 A1 Nov. 3, 2011

Related U.S. Application Data

(60) Provisional application No. 61/329,300, filed on Apr. 29, 2010.

(51) Int. Cl.
*G08B 21/00* (2006.01)
*B60Q 1/42* (2006.01)
*B60C 23/02* (2006.01)

(52) U.S. Cl.
USPC .......... 340/666; 340/937; 116/31; 73/146.2

(58) Field of Classification Search
None
See application file for complete search history.

(56) References Cited

U.S. PATENT DOCUMENTS

| | | |
|---|---|---|
| 4,049,069 A | 9/1977 | Tamamura et al. |
| 4,560,016 A | 12/1985 | Ibanez et al. |
| 4,935,855 A | 6/1990 | Narita |
| 5,002,141 A | 3/1991 | Loshbough et al. |
| 5,546,188 A | 8/1996 | Wangler et al. |
| 5,579,409 A | 11/1996 | Vaidyanathan et al. |
| 5,839,085 A | 11/1998 | Yoshikawa et al. |
| 5,959,259 A | 9/1999 | Beshears et al. |
| 5,998,741 A | 12/1999 | Beshears et al. |
| 6,060,984 A * | 5/2000 | Braun et al. ................... 340/442 |
| 6,181,817 B1 | 1/2001 | Zabih et al. |
| 6,195,019 B1 | 2/2001 | Nagura |
| 6,304,321 B1 | 10/2001 | Wangler et al. |
| 6,459,050 B1 | 10/2002 | Muhs et al. |
| 6,614,536 B1 | 9/2003 | Doemens et al. |
| 6,674,904 B1 | 1/2004 | McQueen |
| 6,885,771 B2 | 4/2005 | Takahashi |
| 7,016,532 B2 | 3/2006 | Boncyk et al. |
| 7,305,324 B2 | 12/2007 | Beshears et al. |
| 7,375,293 B2 * | 5/2008 | Beshears et al. ............ 177/25.13 |
| 7,477,780 B2 | 1/2009 | Boncyk et al. |
| 2002/0105440 A1 | 8/2002 | Bostrom et al. |
| 2002/0154032 A1 | 10/2002 | Hilliard et al. |
| 2002/0180608 A1 * | 12/2002 | Omry et al. .................... 340/576 |
| 2003/0218070 A1 | 11/2003 | Tsikos et al. |
| 2003/0230137 A1 * | 12/2003 | Kemp et al. ..................... 73/117 |

(Continued)

*Primary Examiner* — George Bugg
*Assistant Examiner* — Renee Dorsey
(74) *Attorney, Agent, or Firm* — Foley & Lardner LLP

(57) ABSTRACT

A system includes a camera, a weigh-in-motion scale, and a processor. The camera is configured to capture one or more images of a vehicle as the vehicle goes over the weigh-in-motion scale. The weigh-in-motion scale is configured to generate one or more weight measurements of the vehicle as the vehicle goes over the weigh-in-motion scale. The processor is operatively coupled to the camera and the weigh-in-motion scale. The processor is configured to determine an acceleration of at least a portion of the vehicle based at least in part on the one or more images of the vehicle. The processor is also configured to adjust at least one of the one or more weight measurements based on the acceleration.

20 Claims, 25 Drawing Sheets

(56) References Cited

U.S. PATENT DOCUMENTS

| | | |
|---|---|---|
| 2004/0021579 A1 | 2/2004 | Oursler et al. |
| 2005/0087121 A1* | 4/2005 | Brown et al. .................. 116/31 |
| 2005/0270178 A1 | 12/2005 | Ioli |
| 2006/0044125 A1* | 3/2006 | Pierbon ........................ 340/442 |
| 2006/0157012 A1 | 7/2006 | Kanno |
| 2008/0062008 A1* | 3/2008 | Morimoto et al. ............ 340/936 |
| 2008/0106462 A1 | 5/2008 | Shiraishi |
| 2008/0136676 A1 | 6/2008 | Yano |
| 2008/0319706 A1 | 12/2008 | Uffenkamp et al. |
| 2009/0125273 A1 | 5/2009 | Hively et al. |
| 2009/0143986 A1* | 6/2009 | Stein et al. .................... 701/301 |
| 2009/0151421 A1* | 6/2009 | Susor ............................ 73/1.13 |
| 2010/0013617 A1* | 1/2010 | Fujita et al. ................... 340/443 |
| 2010/0034468 A1 | 2/2010 | Boncyk et al. |

* cited by examiner

| Record Number | Year | Make | Model | Style | Catagory | Length (in) | Height (in) | Ground Clearance (in) | Wheel Base (in) | Width (in) | Curb Weight (dry) (lb) | Shape Statistics Set | Shape Template | Threshold Weight (lb) |
|---|---|---|---|---|---|---|---|---|---|---|---|---|---|---|
| ... | | | | | | | | | | | | | | |
| 1119 | 1999 | Toyota | Corolla | LE | compact | 178.3 | 57.7 | 6 | 102 | 66.9 | 2403 | [sd(i)] | [t(i,j)] | 2903 |
| ... | | | | | | | | | | | | | | |
| 2548 | 2010 | Ford | F-150 | XL-2DR RC | pickup | 213.1 | 74.6 | 8.6 | 146 | 78.9 | 4743 | [sd(i)] | [t(i,j)] | 4843 |
| 3203 | 1992 | Ford | Econoline | 4 DR Ext | pass van | 232 | 80.7 | 8.4 | 138 | 79.3 | 4773 | [sd(i)] | [t(i,j)] | 4880 |
| ... | | | | | | | | | | | | | | |

Fig. 13

WEIGH-IN-MOTION SCALE

CROSS REFERENCE TO RELATED APPLICATIONS

The present application claims priority to U.S. Provisional Patent App. No. 61/329,300 filed on Apr. 29, 2010, the entire disclosure of which is incorporated by reference herein.

BACKGROUND

There have been many suicide bomber attacks using vehicle borne improvised explosive devices (VBIED) over the past two decades, which have resulted in a huge loss of life. The typical tactic employed by the terrorist group is to load a vehicle with low cost explosives and drive to a political target, such as an embassy, military base, sports event, etc. Most attacks of this type have used between 250 and 2000 pounds of explosives concealed in the vehicle. To mitigate the damage from this type of attack, it is necessary to detect and deter the vehicle well before it enters the target area.

The Alcohol, Tobacco and Firearms website lists explosive payload based on vehicle size and type. For example, a compact sedan can carry up to 500 pounds of explosives; whereas a passenger van or cargo van can carry up to 4000 pounds. Some early VBIED threats were easily identified because the heavy explosive payload caused the vehicle to ride very low on its suspension. Since that time terrorists have learned to add (i.e., weld) additional support to the suspension under the heavy explosives so that the vehicle appears to ride normally.

Commercial axle scales have been developed primarily for use as truck scales for enforcing highway load limits. Traditional truck scales have used large platforms to measure multiple axles while the vehicle is stopped on the scale. More recently, weigh-in-motion (WIM) systems have been developed to allow the vehicles to continue moving over the scale without stopping. Some systems, like the Fairbanks Model 4020, require the vehicle to slow to less than 5 miles per hour (mph) while others, like the IRD Bending Plate WIM Sensor can measure a weight of a vehicle when the vehicle is at full highway speed. The WIM scales measure each axle separately or, in some cases, each tire separately. Thus, commercial axle scales and WIM scales provide examples of a number of different means for determining a vehicle weight. Commercial axle scales may be more effectively utilized at border crossings where custom's officials have the task of determining which vehicles should be subjected to detailed inspection to uncover illegal drug or commercial trafficking and/or terrorist threat.

SUMMARY

In an example embodiment, a method for assessing a threat potential of a vehicle is provided. Dimensional characteristics of the vehicle are determined based on image data of the vehicle. A make and a model of the vehicle is identified based on the determined dimensional characteristics of the vehicle. A number of passengers in the vehicle is identified based on the image data of the vehicle. A payload weight threshold is identified for the vehicle based on the identified make and model of the vehicle. A non-passenger weight is identified for the vehicle based on the identified make and model of the vehicle. A passenger weight is identified for the vehicle based on the identified number of passengers. A payload weight is determined by subtracting the identified non-passenger weight for the vehicle and the identified passenger weight for the vehicle from the received weight data for the vehicle. The determined payload weight is compared to the identified payload weight threshold. An alert is generated based on the comparison.

In another example embodiment, a computer-readable medium is provided having stored thereon computer-readable instructions that if executed by a computing device, cause the computing device to perform the method of assessing a threat potential of a vehicle. Further, any of the operations described herein may be implemented as computer-readable instructions that are stored on a computer-readable medium.

In yet another example embodiment, a computing system is provided. The system includes, but is not limited to, a communication interface, a processor, and the computer-readable medium operably coupled to the processor. The communication interface is configured to receive image data of a vehicle and weight data for the vehicle. The computer-readable medium has instructions stored thereon that when executed by the processor, cause the system to perform the method of assessing a threat potential of a vehicle.

In yet another example embodiment, a vehicle alert system is provided. The system includes, but is not limited to, a scale, an imaging system, and the computing system. The scale is configured to detect weight data for a vehicle. The imaging system is configured to capture image data for the vehicle.

Another illustrative system includes a camera, a weigh-in-motion scale, and a processor. The camera is configured to capture one or more images of a vehicle as the vehicle goes over the weigh-in-motion scale. The weigh-in-motion scale is configured to generate one or more weight measurements of the vehicle as the vehicle goes over the weigh-in-motion scale. The processor is operatively coupled to the camera and the weigh-in-motion scale. The processor is configured to determine an acceleration of at least a portion of the vehicle based at least in part on the one or more images of the vehicle. The processor is also configured to adjust at least one of the one or more weight measurements based on the acceleration.

Another illustrative method includes capturing, with a camera, one or more images of a vehicle as the vehicle goes over a weigh-in-motion scale. One or more weight measurements of the vehicle are generated as the vehicle goes over the weigh-in-motion scale. An acceleration of at least a portion of the vehicle is determined based at least in part on the one or more images of the vehicle. At least one of the one or more weight measurements is adjusted based on the acceleration.

Another illustrative computer-readable medium has computer-readable instructions stored thereon. The instructions include instructions to capture one or more images of a vehicle as the vehicle goes over a weigh-in-motion scale. The instructions also include instructions to generate one or more weight measurements of the vehicle as the vehicle goes over the weigh-in-motion scale. The instructions also include instructions to determine an acceleration of at least a portion of the vehicle based at least in part on the one or more images of the vehicle. The instructions further include instructions to adjust at least one of the one or more weight measurements based on the acceleration.

The foregoing summary is illustrative only and is not intended to be in any way limiting. Other principal features and advantages of the invention will become apparent to those skilled in the art upon review of the following drawings, the detailed description, and the appended claims.

BRIEF DESCRIPTION OF THE DRAWINGS

Example embodiments will hereafter be described with reference to the accompanying drawings, wherein like numerals denote like elements. The drawings depict example embodiments in accordance with the disclosure and are, therefore, not to be considered limiting of its scope.

FIG. 13 illustrates sample database entries in accordance with an example embodiment.

DETAILED DESCRIPTION

Figure 1:
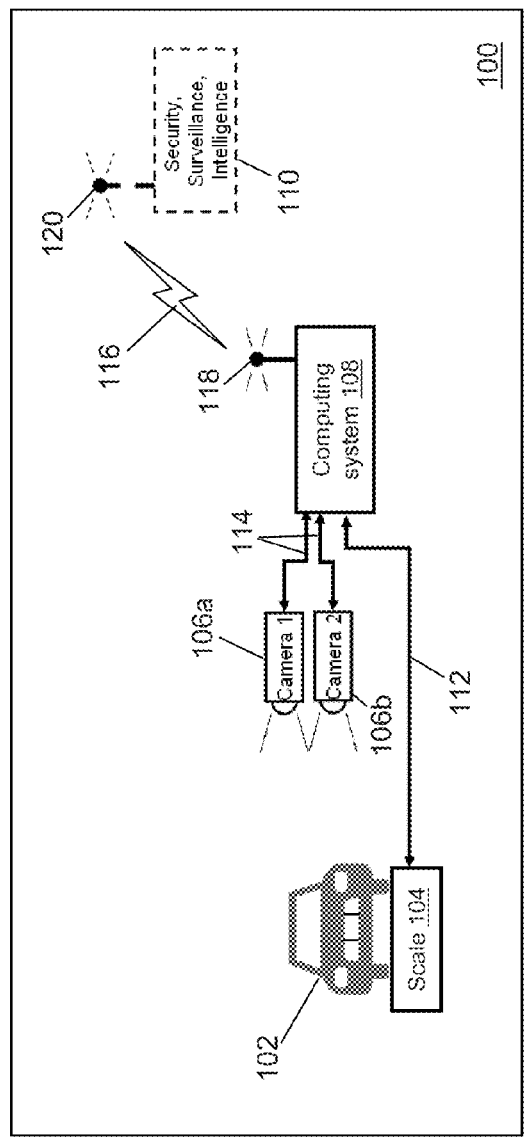
FIG. 1 depicts a block diagram of a vehicle alert system in accordance with an example embodiment.

With reference to FIG. 1, a block diagram of a vehicle alert system 100 is shown in accordance with an example embodiment. Vehicle alert system 100 may include a vehicle 102, a scale 104, one or more cameras 106a, 106b, a computing system 108, and a security, surveillance and intelligence system 110. Vehicle 102 can be any type of moving or movable structure such as a car, trucks of various sizes having various number of axles, vans, trailers, etc. Vehicle alert system 100 determines characteristics of vehicle 102 to determine the possibility that vehicle 102 is carrying an explosive device.

One or more networks of the same or different types may allow communication between scale 104, the one or more cameras 106a, 106b, computing system 108, and security, surveillance and intelligence system 110. The one or more networks can be any type or combination of wired and/or wireless public or private network including a cellular network, a local area network, a wide area network such as the Internet, etc. The one or more networks further may be comprised of sub-networks and consist of any number of devices. In the example embodiment of FIG. 1, scale 104 communicates with computing system 108 through a first communication link 112, the one or more cameras 106a, 106b communicate with computing system 108 through one or more communication links 114, and computing system 108 communicates with security, surveillance and intelligence system 110 through a second communication link 116. In the example embodiment of FIG. 1, first communication link 112 and the one or more communication links 114 are depicted as wired communication links and second communication link 116 is depicted as a wireless communication link utilizing a first antenna 118 of computing system 108 and a second antenna 120 of security, surveillance and intelligence system 110. Any type or combination of wired and/or wireless network linkage, however, may be utilized in vehicle alert system 100 such that the various components can communicate.

Thus, the components of vehicle alert system 100 may be positioned in a single location, a single facility, and/or may be remote from one another. One or more of the components of vehicle alert system 100 may be connected directly, for example, using a cable for transmitting information between systems. One or more of the components of vehicle alert system 100 may be connected using the one or more networks.

Scale 104 may include any type of load sensing device placed in or on a road bed to determine a total vehicle weight, an axle weight, and/or a tire weight of vehicle 102 without limitation. For example, scale 104 may include a commercial axle scale, weigh-in-motion (WIM) system, etc. Depending on the application environment of vehicle alert system 100, different types of scales may be better utilized. For example, at a border crossing where vehicle 102 is either stopped or traveling at a low rate of speed, a commercial axle scale may be more appropriate; whereas on a highway or city street, a WIM system May be more appropriate because vehicle 102 may not be required to stop.

The one or more cameras 106a, 106b capture a digital image of vehicle 102 and may refer to any type of imaging device. The one or more cameras 106a, 106b are positioned such that the largest vehicle of interest can be viewed within the field-of-view (FOV) of the camera as vehicle 102 crosses scale 104. Both visible and infrared wavelength cameras may be used to obtain high contrast for vehicle shape detection. Multiple cameras may be used to obtain vehicle geometry in both the length and width directions.

Figure 2:
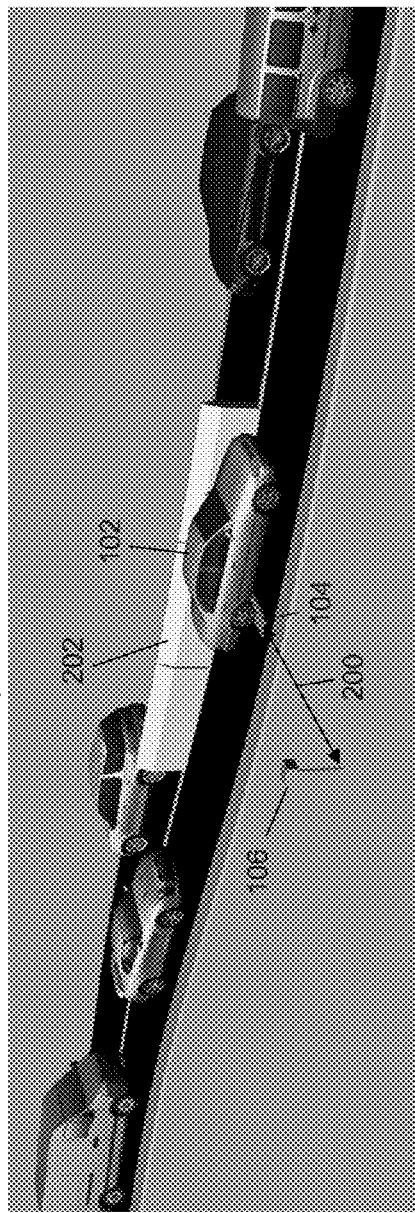
FIG. 2 depicts a diagram of aspects of the vehicle alert system of FIG. 1 in accordance with an example embodiment.

The distance from the one or more cameras 106a, 106b to the traffic lane is known to scale the camera FOV. For example, with reference to FIG. 2, an imaging system 106 is shown a distance 200 from scale 104 and the traffic lane on which vehicle 102 is traveling. A background 202 may provide a backdrop, which enhances the ability of imaging system 106 to obtain an image that more clearly delineates vehicle 102 from the surrounding environment and traffic.

Figure 3:
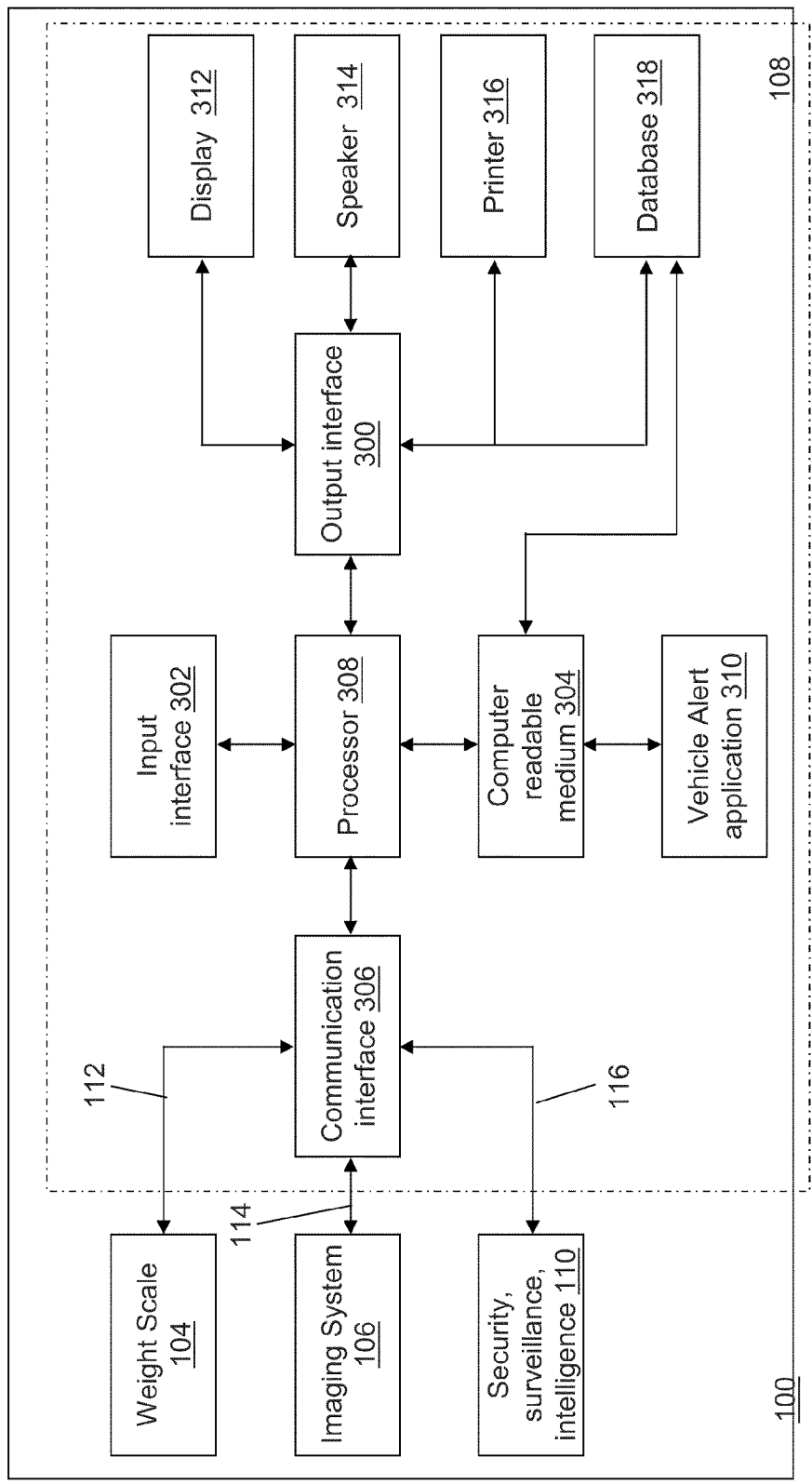
FIG. 3 depicts a second block diagram of the vehicle alert system of FIG. 1 in accordance with an example embodiment.

With reference to FIG. 3, a second block diagram of vehicle alert system 100 is shown in accordance with an example embodiment. Computing system 108 may include an output interface 300, an input interface 302, a computer-readable medium 304, a communication interface 306, a processor 308, a vehicle alert application 310, a display 312, a speaker 314, a printer 316, and a database 318. Different and additional components may be incorporated into computing system 108. Computing system 108 may include a computer of any form factor such as a personal digital assistant, a desktop, a laptop, an integrated messaging device, a cellular telephone, a smart phone, a pager, etc.

Output interface 300 provides an interface for outputting information for review or analysis by a user of computing system 108. Computing system 108 may have one or more output interfaces that use the same or a different interface technology. For example, output interface 300 may include an interface to display 312, speaker 314, printer 316, database 318, etc. Display 312 may be a thin film transistor display, a light emitting diode display, a liquid crystal display, or any of a variety of different displays known to those skilled in the art. Speaker 314 may be any of a variety of speakers as known to those skilled in the art. Printer 316 may be any of a variety of printers as known to those skilled in the art. Display 312, speaker 314, printer 316, and/or database 318 further may be accessible to computing system 108 through communication interface 306.

Input interface 302 provides an interface for receiving information from the user for entry into computing system 108 as known to those skilled in the art. Input interface 302 may use various input technologies including, but not limited to, a keyboard, a pen and touch screen, a mouse, a track ball, a touch screen, a keypad, one or more buttons, etc. to allow the user to enter information into computing system 308 or to make selections presented in a user interface displayed on display 312. The same interface may support both input interface 302 and output interface 300. For example, a touch screen both allows user input and presents output to the user. Computing system 108 may have one or more input interfaces that use the same or a different input interface technology.

Computer-readable medium 304 is an electronic holding place or storage for information so that the information can be accessed by processor 308 as known to those skilled in the art. Computer-readable medium 304 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. Computing system 108 may have one or more computer-readable media that use the same or a different memory media technology. Computing system 108 also may have one or more drives that support the loading of a memory media such as a CD or DVD. Computer-readable medium 304 may provide the electronic storage medium for database 318.

Communication interface 306 provides an interface for receiving and transmitting data between devices using various protocols, transmission technologies, and media as known to those skilled in the art. Communication interface 306 may support communication using various transmission media that may be wired or wireless. Computing system 108 may have one or more communication interfaces that use the same or a different communication interface technology. Data and messages may be transferred between computing system 108 and scale 104, the one or more cameras 106a, 106b, and/or security, surveillance and intelligence system 110 using communication interface 306.

Processor 308 executes instructions as known to those skilled in the art. The instructions may be carried out by a special purpose computer, logic circuits, or hardware circuits. Thus, processor 308 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor 308 executes an instruction, meaning that it performs/controls the operations called for by that instruction. Processor 308 operably couples with output interface 300, with input interface 302, with computer-readable medium 304, and with communication interface 306 to receive, to send, and to process information. Processor 308 may retrieve a set of instructions from a permanent memory device and copy the instructions in an executable form to a temporary memory device that is generally some form of RAM. Computing system 108 may include a plurality of processors that use the same or a different processing technology.

Vehicle alert application 310 performs operations associated with determining if a vehicle is carrying an excessive payload which may be an explosive device and alerting security personnel concerning a vehicle identified as carrying an explosive device. Some or all of the operations described herein may be embodied in vehicle alert application 310. The operations may be implemented using hardware, firmware, software, or any combination of these methods. With reference to the example embodiment of FIG. 3, vehicle alert application 310 is implemented in software (comprised of computer-readable and/or computer-executable instructions) stored in computer-readable medium 304 and accessible by processor 308 for execution of the instructions that embody the operations of vehicle alert application 310. Vehicle alert application 310 may be written using one or more programming languages, assembly languages, scripting languages, etc.

Computing system 108 includes or can access database 318 either through a direct connection such as by being part of computer readable medium 304 or through output interface 300. Database 318 is a data repository for vehicle alert system 100. Database 318 may include a plurality of databases that may be organized into multiple database tiers to improve data management and access. Database 318 may utilize various database technologies and a variety of different formats as known to those skilled in the art including a file system, a relational database, a system of tables, a structured query language database, etc. Database 318 may be implemented as a single database or as multiple databases stored in different storage locations distributed over a network such as the Internet.

Figure 4:
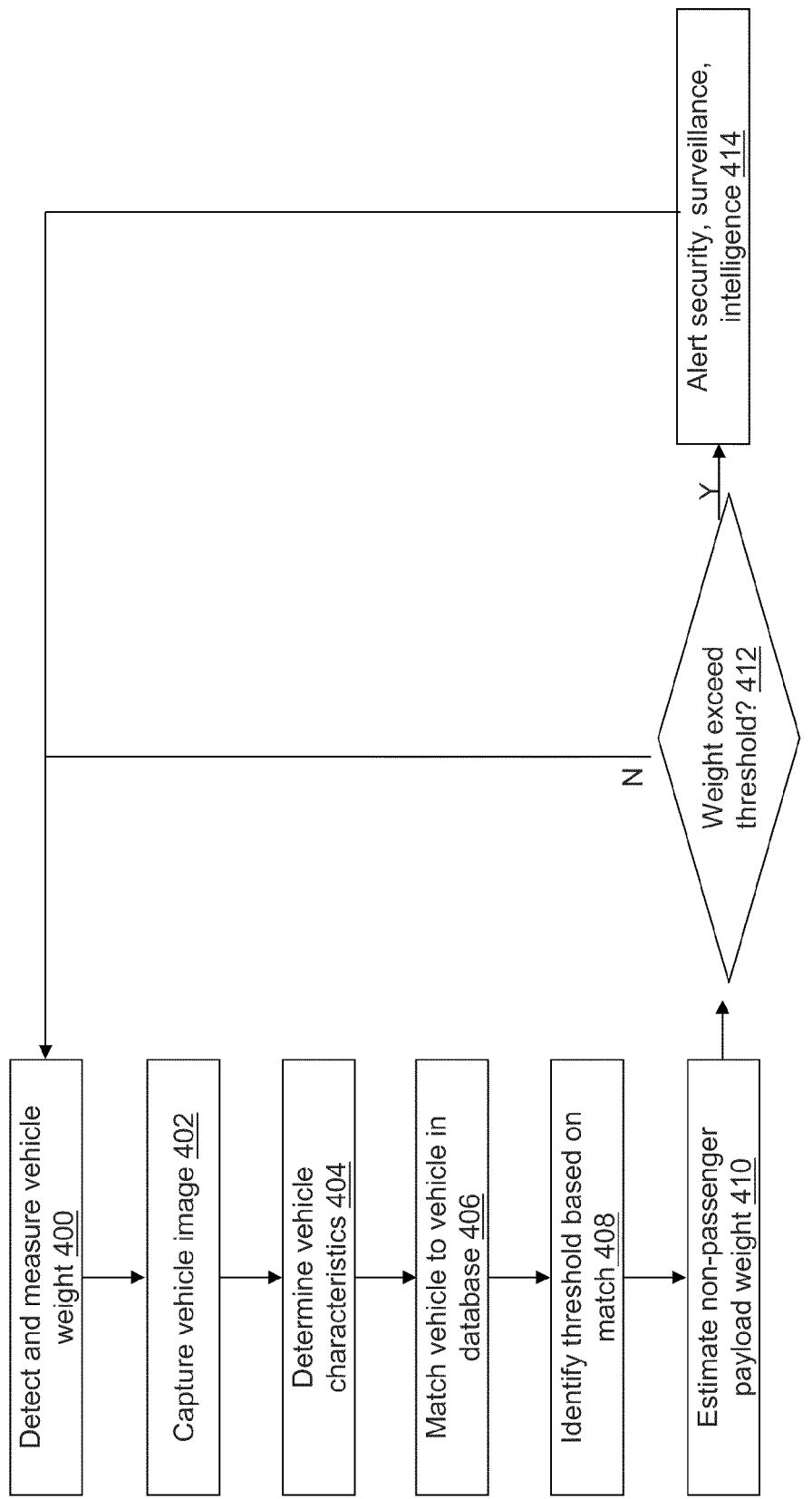
FIG. 4 depicts a flow diagram illustrating example operations performed using a vehicle alert application of a computing device of the vehicle alert system of FIGS. 1 and 3 in accordance with an example embodiment.

With reference to FIG. 4, example operations associated with vehicle alert application 310 are described. Additional, fewer, or different operations may be performed depending on the embodiment. The order of presentation of the operations of FIG. 4 is not intended to be limiting. In addition, although some of the operational flows are presented in sequence, the various operations may be performed in various repetitions, concurrently, and/or in other orders than those that are illustrated. In an operation 400, scale 104 detects the presence of a vehicle and measures a weight of vehicle 102 which may be a total vehicle weight, a weight per axle, and/or a tire weight. The weight data is sent from scale 104 and received by computing system 108 through first communication link 112 and communication interface 306.

In an operation 402, imaging system 106 captures an image of vehicle 102. In an example embodiment, imaging system 106 captures the image as vehicle 102 crosses scale 104 so that the image can be appropriately associated with the measured weight. For example, with reference to FIG. 5, the image of vehicle 102 is captured in a FOV 500 of imaging system 106 as vehicle 102 crosses scale 104. Imaging system 106 may be triggered by the weight of a vehicle crossing scale 104. In an example embodiment, other imaging systems such as laser or radar may be used to identify the vehicle shape and size. The image of vehicle 102 is sent from imaging system 106 and received by computing system 108 through one or more communication links 114 and communication interface 306.

With continuing reference to FIG. 4, in an operation 404, vehicle characteristics are determined from the image of vehicle 102. For example, with reference to FIG. 6, vehicle characteristics such as the vehicle shape and dimensions are determined. Additional vehicle characteristics determined may include a vehicle color, body type, number of passengers, vehicle area, and vehicle volume. As an example, the vehicle volume may be estimated from multiple images taken from different directions, and the number of passengers may be determined using an ultraviolet sensor.

Figure 6:
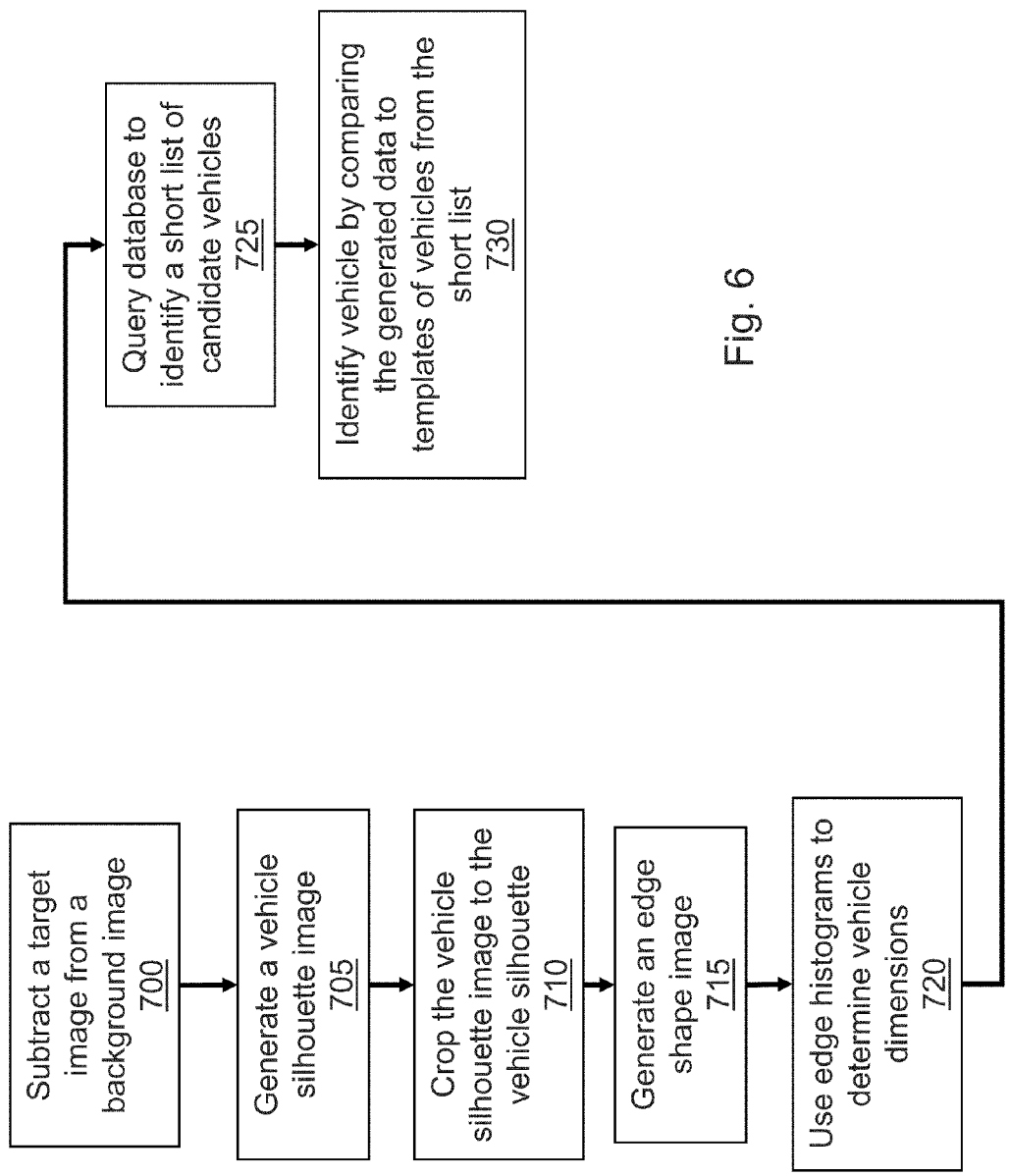
FIG. 6 depicts a flow diagram illustrating example operations performed using the vehicle alert application to determine vehicle characteristics in accordance with an example embodiment.

With reference to FIG. 6, example operations associated with determining vehicle characteristics are described. Additional, fewer, or different operations may be performed depending on the embodiment. The order of presentation of the operations of FIG. 6 is not intended to be limiting. In addition, although some of the operational flows are presented in sequence, the various operations may be performed in various repetitions, concurrently, and/or in other orders than those that are illustrated. In the process described with reference to FIG. 6, a first recognition algorithm is used to query a database to find a short list of candidate vehicles, and a second algorithm is used to find the best vehicle match. The use of two algorithms greatly reduces the amount of computation while maintaining the fidelity of vehicle recognition. In alternative embodiments, only a single algorithm may be used.

Figure 7:
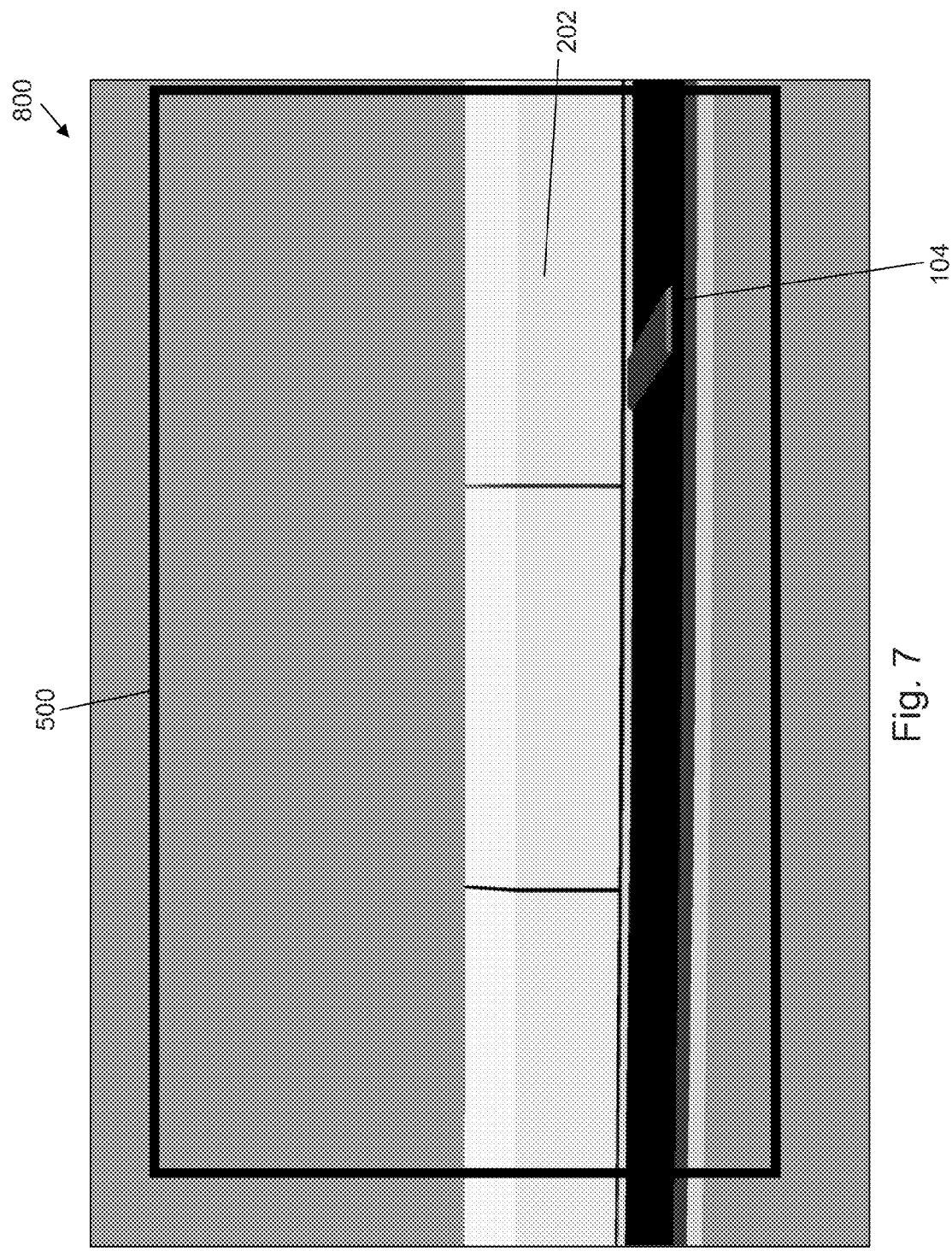
FIG. 7 illustrates a reference background image in accordance with an example embodiment.
Figure 8:
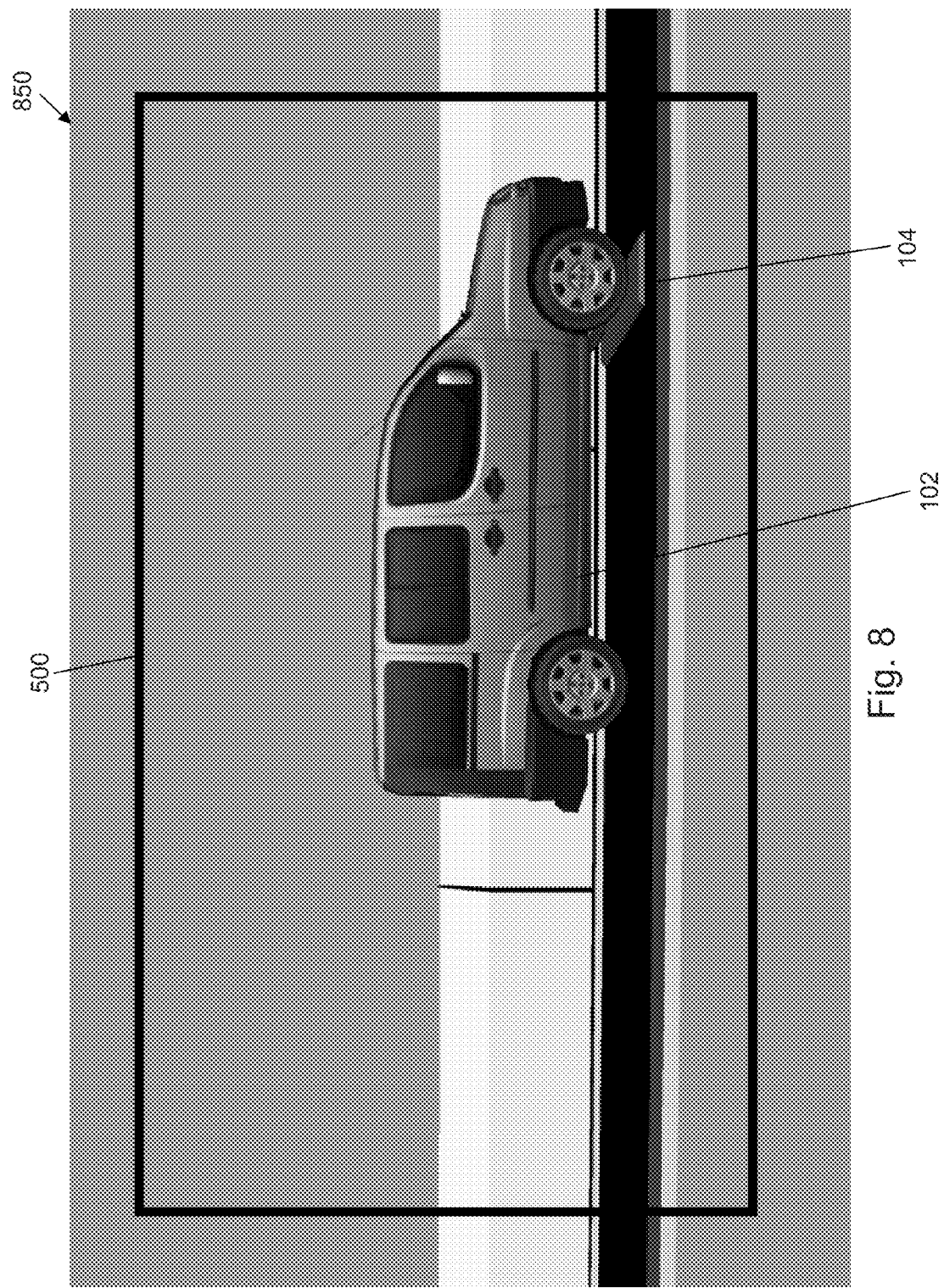
FIG. 8 illustrates a vehicle image in accordance with an example embodiment.

In an operation 700, the target image of the vehicle is subtracted from the background image. In an example embodiment, the subtraction is performed using pixel intensity differences between the vehicle image and the background image. FIG. 7 illustrates a reference background image 800 in accordance with an example embodiment. Reference background image 800 includes background 202, camera field of view 500, and scale 104. In alternative embodiments, camera field of view 500 may be larger, smaller, or of a different shape. Also, scale 104 is illustrated as an axle scale. In other alternative embodiments, additional scales and/or different types of scales may be used. FIG. 8 illustrates a vehicle image 850 in accordance with an example embodiment. Vehicle image 850, which includes vehicle 102, also includes camera field of view 500 and scale 104.

Figure 9:
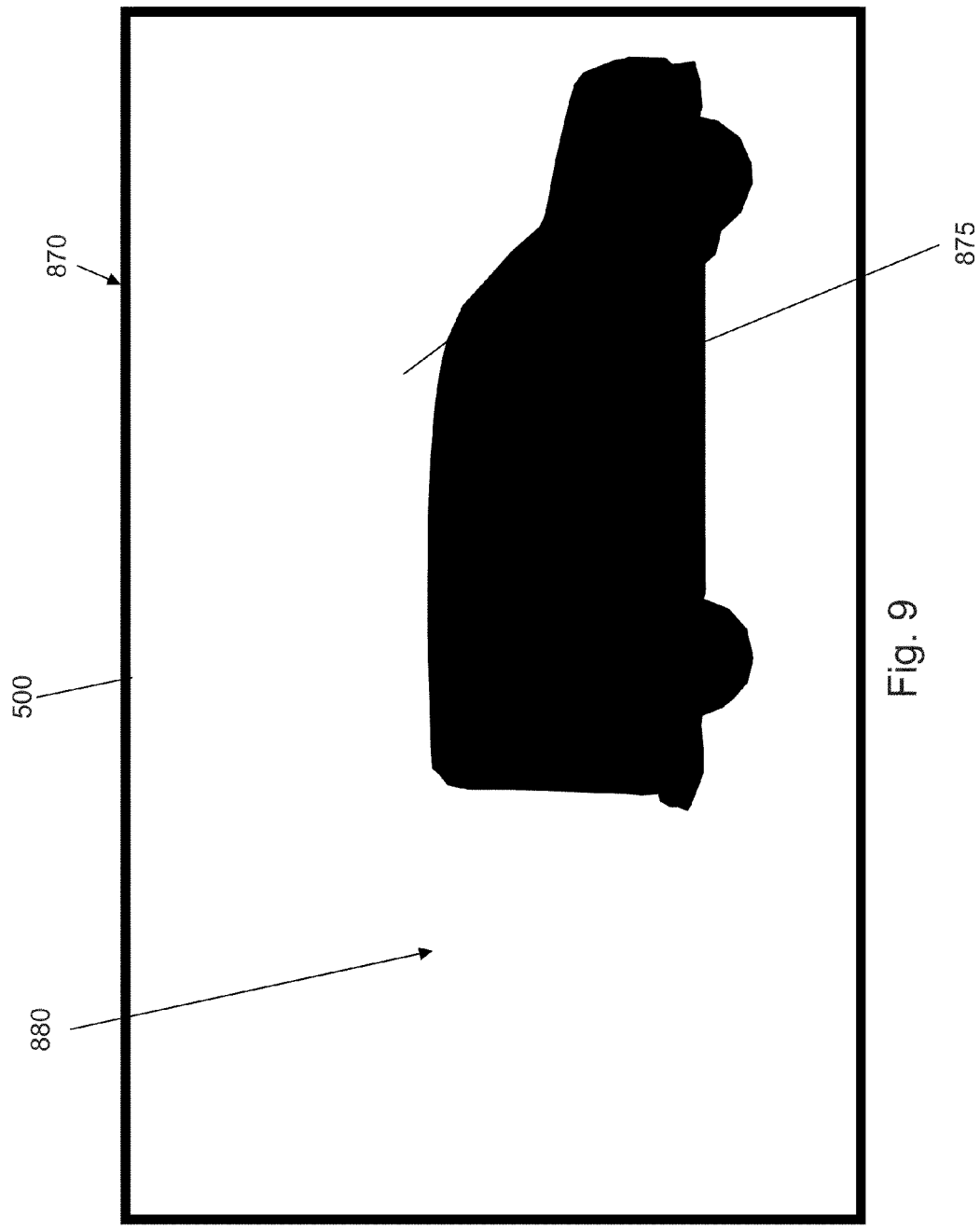
FIG. 9 illustrates a vehicle silhouette image generated in accordance with an example embodiment.

Referring again to FIG. 6, a vehicle silhouette image is generated in an operation 705. In one embodiment, the vehicle silhouette image is generated based on a pixel intensity difference between reference background image 800 and vehicle image 850. To account for changes in lighting, a most recent reference background image taken prior to arrival of the vehicle is used to conduct the image comparison. Also, to reduce the effect of different lighting conditions (due to the weather, position of the sun, etc), various image preprocessing techniques known to those of skill in the art may be used to increase the contrast and/or highlight vehicle edges. The pixel intensity difference between the two images can be used to generate the vehicle silhouette image according to any methods known to those of skill in the art. In an example embodiment, the vehicle silhouette corresponds to areas in which the difference (delta) in pixel intensity between the two images is greater than a predetermined pixel intensity difference threshold. FIG. 9 illustrates a vehicle silhouette image 870 generated in accordance with an example embodiment. As indicated in FIG. 9, vehicle silhouette image 870 includes a vehicle silhouette 875 within camera filed of view 500. A low delta region 880 within camera field of view 500 corresponds to a low pixel intensity difference (or low delta) between the reference background image and the vehicle image. Vehicle silhouette 875 corresponds to a high pixel intensity difference (or high delta) between the reference background image and the vehicle image.

Figure 10:
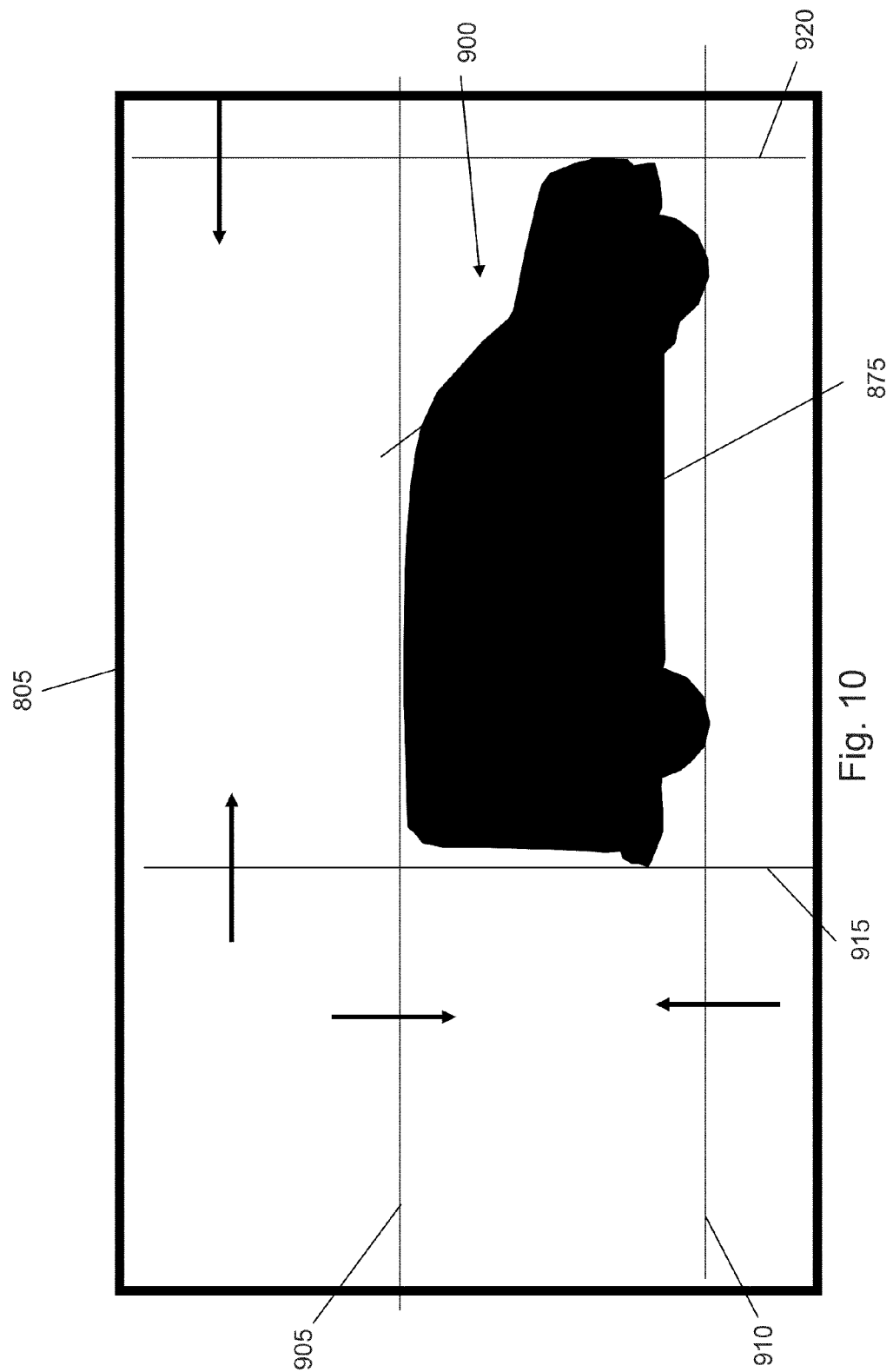
FIG. 10 illustrates a cropped vehicle silhouette image in accordance with an example embodiment.

With further reference to FIG. 6, vehicle silhouette image 870 is cropped based on vehicle silhouette 875 in an operation 710. In an example embodiment, vehicle silhouette image 870 is cropped by moving the left, right, top, and bottom boundaries of vehicle silhouette image 870 inward until each of the bounds reach a region of pixels having a high pixel intensity difference (i.e., the outer edge of vehicle silhouette 875). FIG. 10 illustrates a cropped vehicle silhouette image 900 in accordance with an example embodiment. As illustrated in FIG. 10, a top boundary 905 is adjacent to a top of vehicle silhouette 875, a bottom boundary 910 is adjacent to a bottom of vehicle silhouette 875, a left boundary 915 is adjacent to a left edge of vehicle silhouette 875, and a right boundary 920 is adjacent to a right edge of vehicle silhouette 875.

Figure 11:
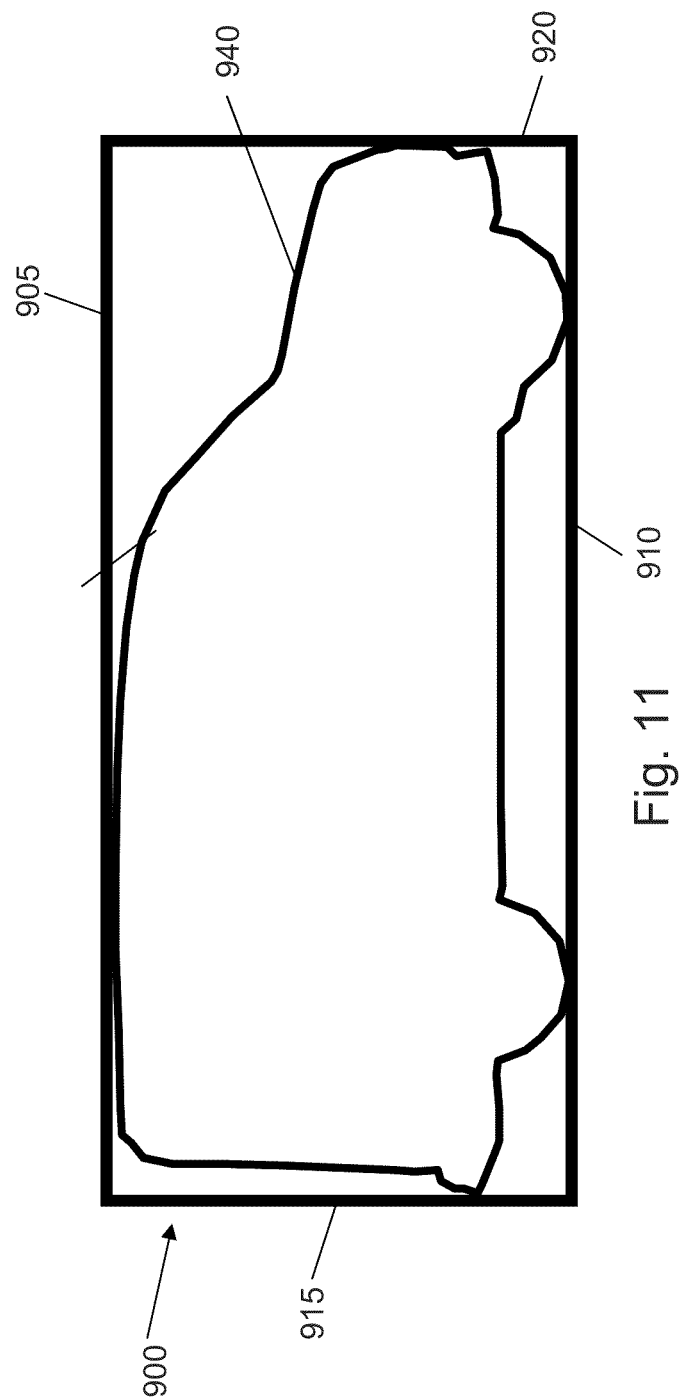
FIG. 11 illustrates an edge shape image generated in accordance with an example embodiment.

With further reference to FIG. 6, an edge shape image is generated based on the cropped vehicle silhouette image 900 in an operation 715. The edge shape image can be generated by processing cropped vehicle silhouette image 900 using one or more edge detection algorithms. In an example embodiment, the Canny edge detection algorithm can be used. Alternatively, other algorithms known to those of skill in the art may also be used. Processing cropped vehicle silhouette image 900 can include applying a filter to the cropped image to reduce noise. A discrete differential operator can also be applied to the cropped image to obtain contrast gradients for the cropped image pixels. Pixels having a high contrast gradient (i.e., above a pixel contrast gradient threshold) with discrete angular edge directions [0, 45, 90, 135 degrees] are classified according to the contrast gradients of surrounding pixels. Non-maximum suppression and hysteresis can also be applied to the pixel edge directions to produce continuous edge contours, which can be used for vehicle analysis and identification. FIG. 11 illustrates an edge shape image 940 generated in accordance with an example embodiment. Edge shape image 940 is based on cropped vehicle silhouette image 900, which is delineated by top boundary 905, bottom boundary 910, left boundary 915, and right boundary 920 as described above with reference to FIG. 10.

With further reference to FIG. 6, edge histograms are generated and used to determine vehicle dimensions in an operation 720. In an example embodiment, the edge shape image of the vehicle can be used to construct histograms from each of a plurality of discrete angular edge directions. The histograms can then be analyzed to determine dimensional measurements of the vehicle. For example, the analysis of a histogram for the 90 degree edges (vertical edges) can be used to identify the back and front of the vehicle by the peaks of the edge contour which contain a higher concentration of pixels with the 90 degree edge directions. The horizontal distance between these peaks may then be used to produce a scaled measure of the vehicle's length based on the camera's field of view and distance to the vehicle, as known to those of skill in the art.

Figure 12:
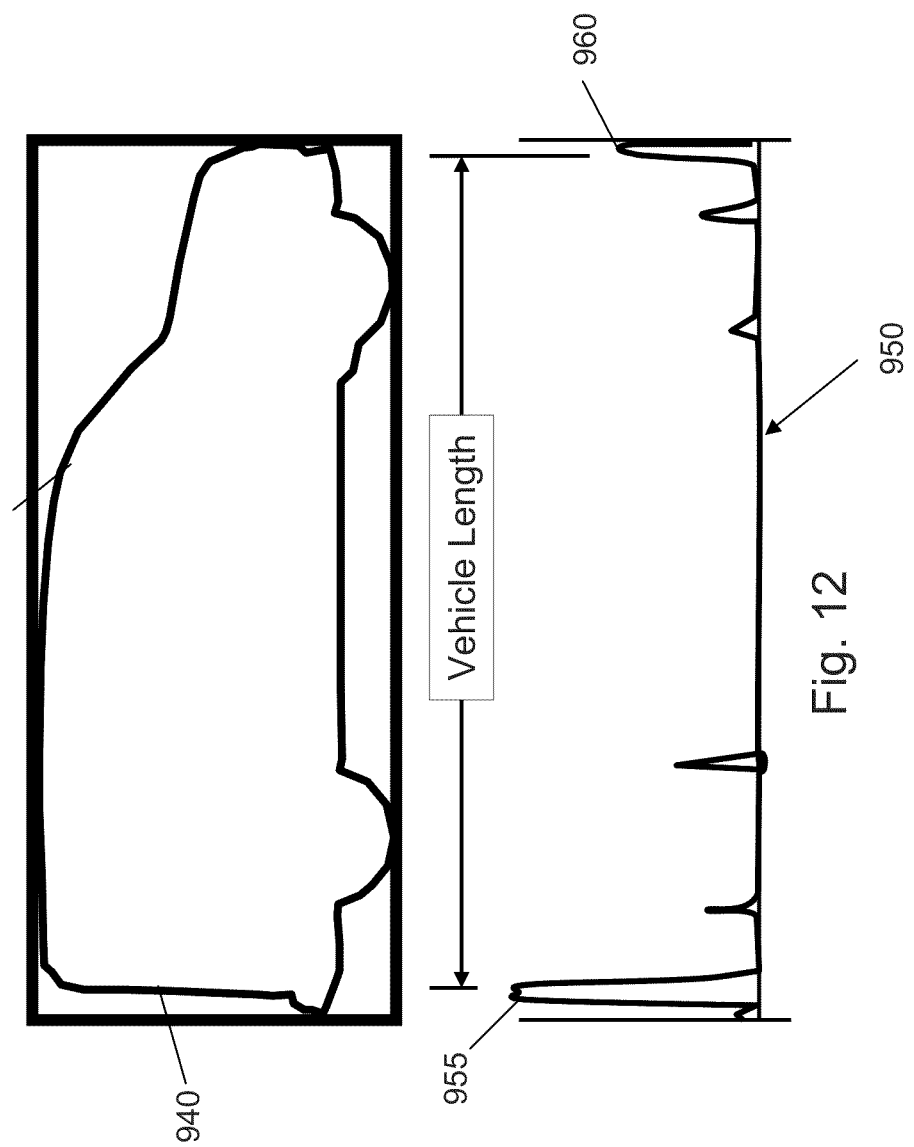
FIG. 12 illustrates a histogram corresponding to an edge shape image in accordance with an example embodiment.

FIG. 12 illustrates a histogram 950 corresponding to edge shape image 940 in accordance with an example embodiment. A rear peak 955 of histogram 950 corresponds to a position of the back of the vehicle and a front peak 960 corresponds to a position of the front of the vehicle. The distance between rear peak 955 and front peak 960 can be used in combination with known dimensions of the field of view and a known distance from the camera to the vehicle to determine the length of the vehicle. Additional histograms can be similarly generated for determining a wheel base of the vehicle, a height of the vehicle, a ground clearance of the vehicle, a width of the vehicle, etc.

Referring again to FIG. 6, in an operation 725, a database (such as database 318) is queried to identify a short list of candidate vehicles based on the determined vehicle dimension(s). The short list can include 3, 5, 10, 12, 15, etc. vehicles that are determined to be the closet potential matches based on the determined vehicle dimension(s). In one embodiment, a dimension threshold may be used to determine whether a given vehicle should be included on the short list. As such, if a determined vehicle dimension is within the dimension threshold (i.e., 2 inches, 4 inches, 6 inches, etc.) of an actual vehicle dimension, the vehicle may be included on the short list. The vehicle may also be included on the short list only if each of a plurality of determined vehicle dimensions are within one or more dimension threshold(s) of the actual vehicle dimensions included in the database.

FIG. 13 illustrates sample database entries in accordance with an example embodiment. In alternative embodiments, a vehicle's database entry may include less, additional, or different information. As an example, the database may also include entries for curb weight for each axle of the vehicle, passenger seating center of gravity (relative to the axles), threshold weight values for each axle, etc. As described above, the database entries can be used to help identify a target vehicle based upon the image data regarding the target vehicle. In some situations, it may be difficult to make an exact identification of the make/year/model/style/etc. of the target vehicle due to the many small variations in vehicles that are sold throughout the world. However, a close match to the target vehicle size and shape will in most cases produce a very close estimate of the specified curb weight and appropriate weight threshold for the target vehicle.

Again referring to FIG. 6, in an operation 730, a vehicle match is determined based on a comparison of the generated vehicle silhouette (or edge shape image of the vehicle) to templates corresponding to vehicles in the short list. In an alternative embodiment, the short list may not be generated and the vehicle match may be determined based on a direct comparison of the generated image data for the vehicle to all vehicle templates stored in the database. In an example embodiment, the comparison can be performed using block matching to find the best correlation between the generated data and the candidate templates from the short list. The block matching can be implemented using a least squares correlation function as known to those of skill in the art. An example least squares correlation function can be:

$$c(x, y) = \sum_{j=0}^{N-1} \sum_{i=0}^{N-1} [t(i, j) - s(x + i, y + j)]^2, \qquad \text{Eq. 1}$$

where t(i,j) represents the template pixel image and s(i,j) represents the generated vehicle silhouette. To account for translation, x and y are varied independently across the image range to produce the correlation function, c(x,y). The minimum of this function is then compared to the other candidate templates. The best match is the one that produces the overall least squares minimum correlation value. In alternative embodiments, different functions/algorithms may be used to perform the comparison.

In accordance with an example embodiment, the vehicle templates stored in the database are generated using the same perspective as the imaging system such that an accurate comparison can be made. As an example, the perspective upon which the vehicle templates are based can include the distance from the imaging system to the vehicle, the magnification used by the imaging system, the vertical position (or height) of the imaging system, the horizontal position of the imaging system relative to the vehicle, etc. As a result, the two-dimensional vehicle templates will represent the three-dimensional vehicle shapes in the same manner that the two-dimensional vehicle images represent the three-dimensional shape of the target vehicle.

In one embodiment, a shape recognition method employing geometric shape descriptors may also be used to identify the target vehicle. For example, vehicle edges and geometric shape descriptors can be determined. In an example embodiment, the geometric shape descriptors are determined as a plurality of equally spaced height measurements made after edge detection has been completed. In an example embodiment, the plurality of equally spaced height measurements is a dozen height measurements though this is not intended to be limiting and other values may be used. Because the vehicle is at a known distance (scale) and rotation, these measurement sets can be compared with descriptor sets from the database to search for the best match.

As known to those of skill in the art, one of the main challenges in any image analysis is the variability of illumination. To help make the vehicle identification process more robust, the system may sample vehicle images in several different spectral bands. Particularly at night, infrared images sampled in the 8-12 μm wavelength can be used to reduce the sensitivity to illumination. Further enhancement may be achieved by positioning the surveillance camera(s) (and WIM sensor) in front of a massive homogeneous background. In an example embodiment, the homogeneous background can be a large concrete structure that is dimensioned to provide a backdrop for a vehicle of any size. Alternatively, the homogenous background may be constructed from any combination of concrete, wood, metal, cloth material, etc. In this way, the background temperature will have a thermal time constant much greater than that of the vehicle body and, hence, exhibit a temperature difference over the diurnal cycle.

With continuing reference to FIG. 4, in an operation 406, the determined vehicle characteristics are used to identify a vehicle make and/or model and/or year of manufacture by matching the determined vehicle characteristics to vehicle characteristics stored in database 318. In an example embodiment, the vehicle make/model/year/etc. can be identified as described with reference to FIGS. 7-13.

In an operation 408, a payload weight threshold is identified from database 318 based on the matching vehicle characteristics. Thus, the payload weight threshold is contained in database 318 and selected based on vehicle make and/or model and/or year of manufacture. In an example embodiment, the vehicle's payload weight threshold is stored in database 318 for each axle. In this way, the payload may be estimated for each axle. Further, alarms may be more sensitive based on where an explosive payload is expected to be placed in vehicle 102 based on vehicle make and/or model and/or year of manufacture.

In an operation 410, a non-passenger payload weight is estimated by subtracting an unloaded vehicle weight identified from database 318 based on the matching vehicle characteristics from the measured vehicle weight. In an example embodiment, the vehicle's unloaded vehicle weight is stored in database 318 for each axle. In an example embodiment, an expected weight of the passengers also may be subtracted from the measured vehicle weight to improve the estimate of the non-passenger payload weight. For example, an average weight per passenger may be multiplied by the determined number of passengers to define the expected weight of the passengers which is subtracted from the measured vehicle weight. Determination of the number of passengers is described in more detail with reference to FIGS. 14-15.

Figure 14:
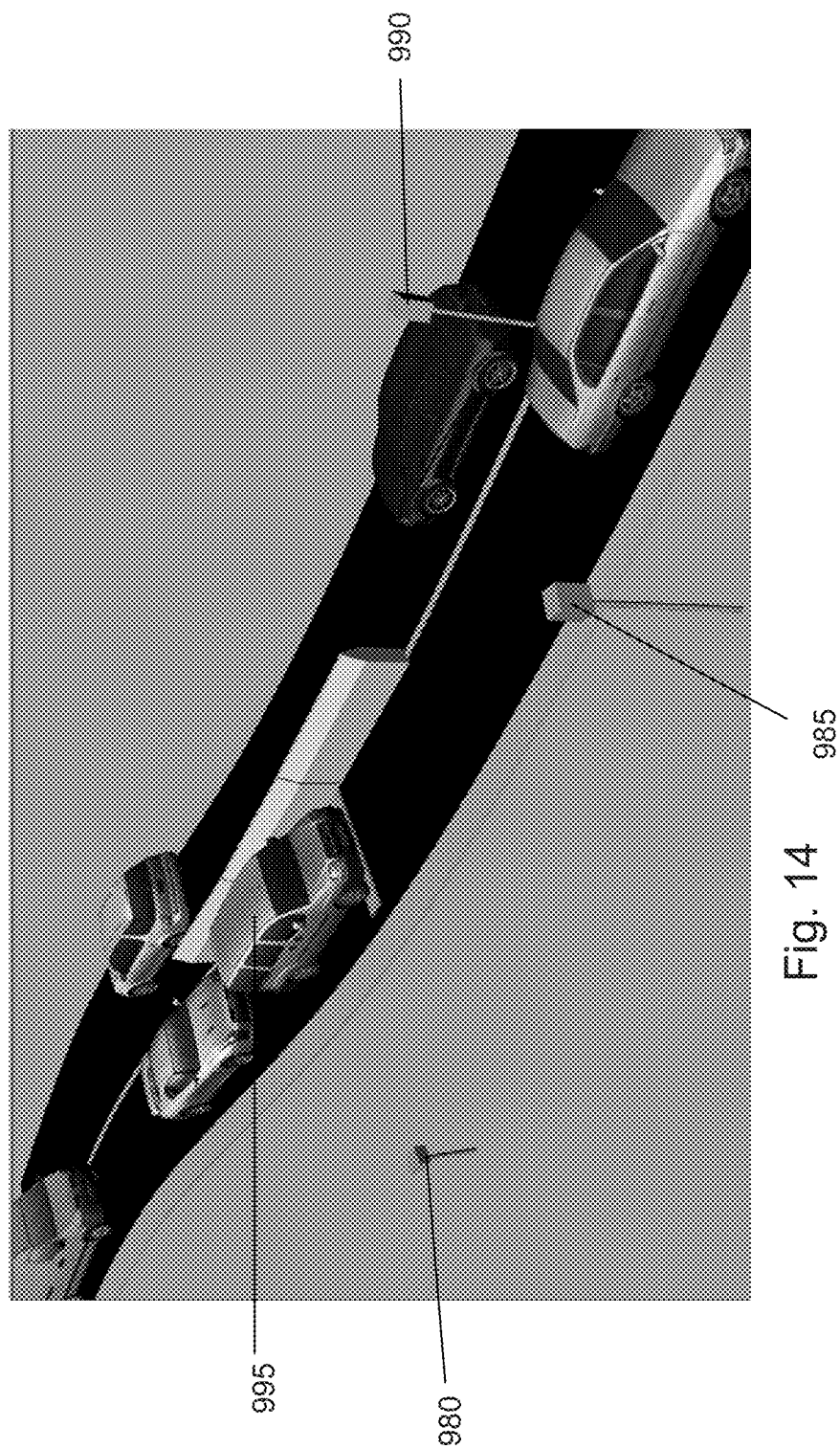
FIG. 14 illustrates a system that includes three distinctly positioned cameras in accordance with an example embodiment.

FIG. 14 illustrates a system that includes a camera 980, a camera 985, and a camera 990 in accordance with an example embodiment. In an example embodiment, camera 980 can be used to capture one or more vehicle images for determining the size/shape of a vehicle 995, and cameras 985 and 990 can be used to capture one or more vehicle images for determining the number and/or size of passengers in vehicle 995. Alternatively, any of cameras 980, 985, and 990 may be used for any purpose. In another alternative embodiment, additional cameras may be included at different angles. For example, a camera may positioned above vehicle 995 so that a top view of vehicle 995 can be obtained.

Identifying the number of passengers is important because many vehicles, including smaller cars, are designed to carry most of their payload as passengers. One difficulty to overcome in identifying passengers is due to the fact that the illumination source is external (sun or artificial lighting) and that glass is reflective. To help reduce reflection, one or more cameras 980, 985, and 990 may be ultraviolet (UV) cameras that are positioned to view the front windshield, side windows, rear window, sunroof, etc. of the vehicle 995. In an example embodiment, the one or more UV cameras can be filtered to a narrow wavelength band in order to minimize glass reflection.

Figure 15:
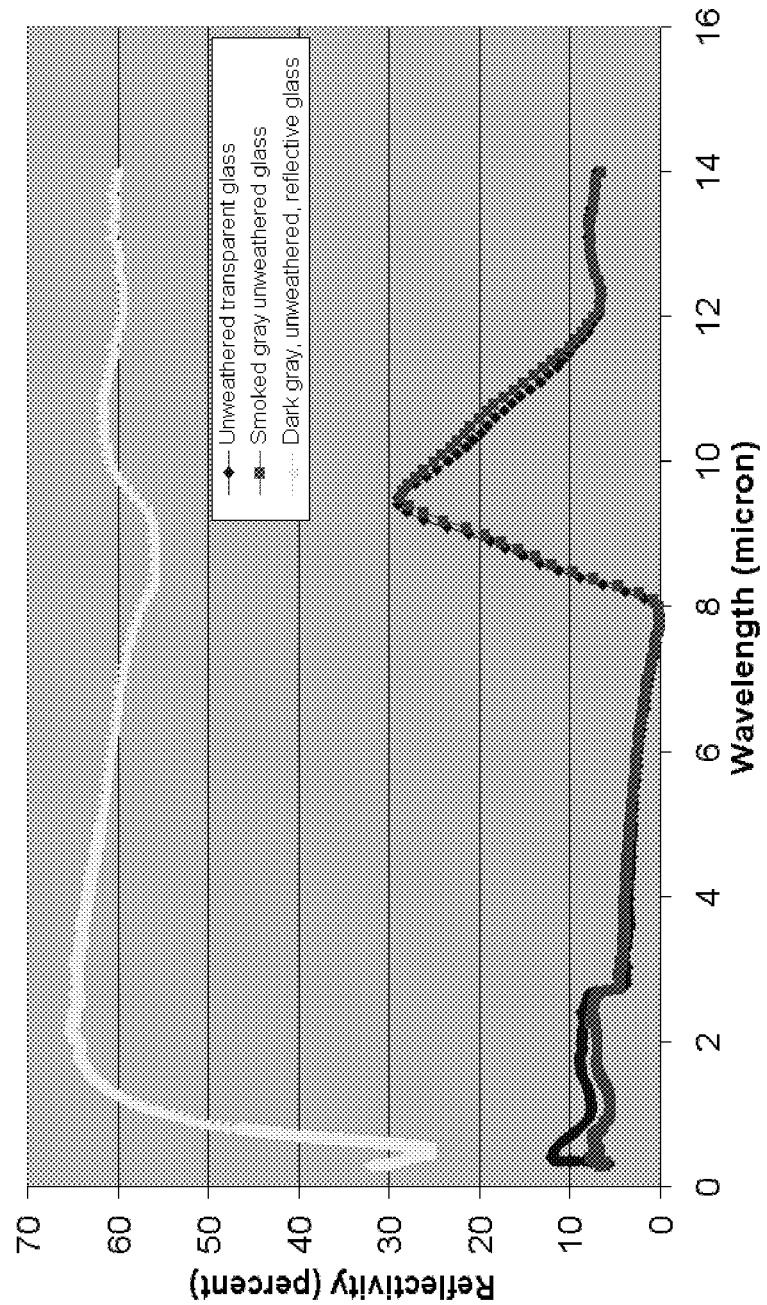
FIG. 15 is a plot illustrating reflectivity versus wavelength for three different types of glass.

FIG. 15 is a plot illustrating reflectivity versus wavelength for three different types of glass. The lower plots in FIG. 15 correspond to un-weathered transparent glass and un-weathered smoked gray glass. The upper plot corresponds to darkened privacy glass and illustrates the challenge of "seeing" through such glass. In an example embodiment, reflection off of the glass can be minimized by imaging in a narrow, short wave band that includes approximately 0.4 to 0.6 micron wavelengths (i.e., UV). One such imaging device is the Resonon Pika II line scan spectrometer, which is sensitive in the 0.4-0.9 micron band. In alternative embodiments, different wavelengths and/or different imaging devices may be used. The reflection may further be reduced by using a polarizing filter oriented to preferentially filter reflection. In one embodiment, in order to enhance the detection of passengers (particularly at night), the vehicle windshield may be illuminated using light in the near infrared band (approximately 0.8-0.9 micron wavelength). In this way, the illumination will be unseen by the driver and yet illuminate the passenger compartment with moderate amounts of glass reflectivity. In one embodiment, passenger detection may be further enhanced through the use of laser radar (LADAR). The LADAR can be tuned to the near infrared band to provide three-dimensional mapping of portions of the passenger compartment.

As described above, the image data is analyzed in order to identify the number of passenger shapes. In an example embodiment, the vehicle shape data may be processed to first determine the vehicle type and size as described above. The vehicle data can then be used to crop the area of interest to just the front windshield, the side windows, the rear window, etc. The cropped image(s) corresponding to the windows can then be analyzed to identify the number of head and shoulder shapes using techniques similar to those used for the vehicle identification. In an example embodiment, the detection fidelity can be improved by using two camera angles and correlating the shape locations.

Referring again to FIG. 4, in an operation 412, a determination is made to determine if the non-passenger payload weight exceeds the identified payload weight threshold. If the non-passenger payload weight does not exceed the identified payload weight threshold, processing continues at operation 400 for the next vehicle 102. If the non-passenger payload weight does exceed the identified payload weight threshold, processing continues at an operation 414. In operation 414, an alert is sent from computing system 108 to security, surveillance and intelligence system 110 identifying vehicle 102 as a potential threat. For example, an alert message may be sent to security, surveillance and intelligence system 110 identifying vehicle 102 using second communication link 116 and communication interface 306, which indicates that vehicle 102 may be carrying an explosive device. Vehicle data may be recorded in database 318 so that security personnel may later search the records to determine if a specific target of interest passed by vehicle alert system 100. Processing continues at operation 400 for the next vehicle 102.

The system components of vehicle alert system 100 may be constructed and arranged to allow covert monitoring of traffic. For example, scale 104 may be integrated into a speed bump or buried in the roadbed; imaging system 106 may be located a distance, such as 200 feet, from the traffic lane and concealed in an existing structure. The system components of vehicle alert system 100 further may be constructed to allow mobile, temporary setups for special events and/or spot monitoring of traffic.

Many traditional WIM scale installations involve carefully inlaying a weigh pad of the scale into the road such that a smooth, flat surface is maintained between the road and WIM scale. As an example of a specification involved with such an installation, ASTM Designation E 1318-92 requires that the surface of a paved roadway is to be maintained 150 feet in advance of and beyond a WIM scale such that a 6 inch diameter circular plate that is 1/8 inch thick cannot be passed under a 20 foot long straight edge that is placed upon the road. The smooth, flat road surface is intended to minimize vertical motion of the vehicle during the weight measurement. This type of installation, however, can be expensive and the installation process can be time consuming.

Figure 5:
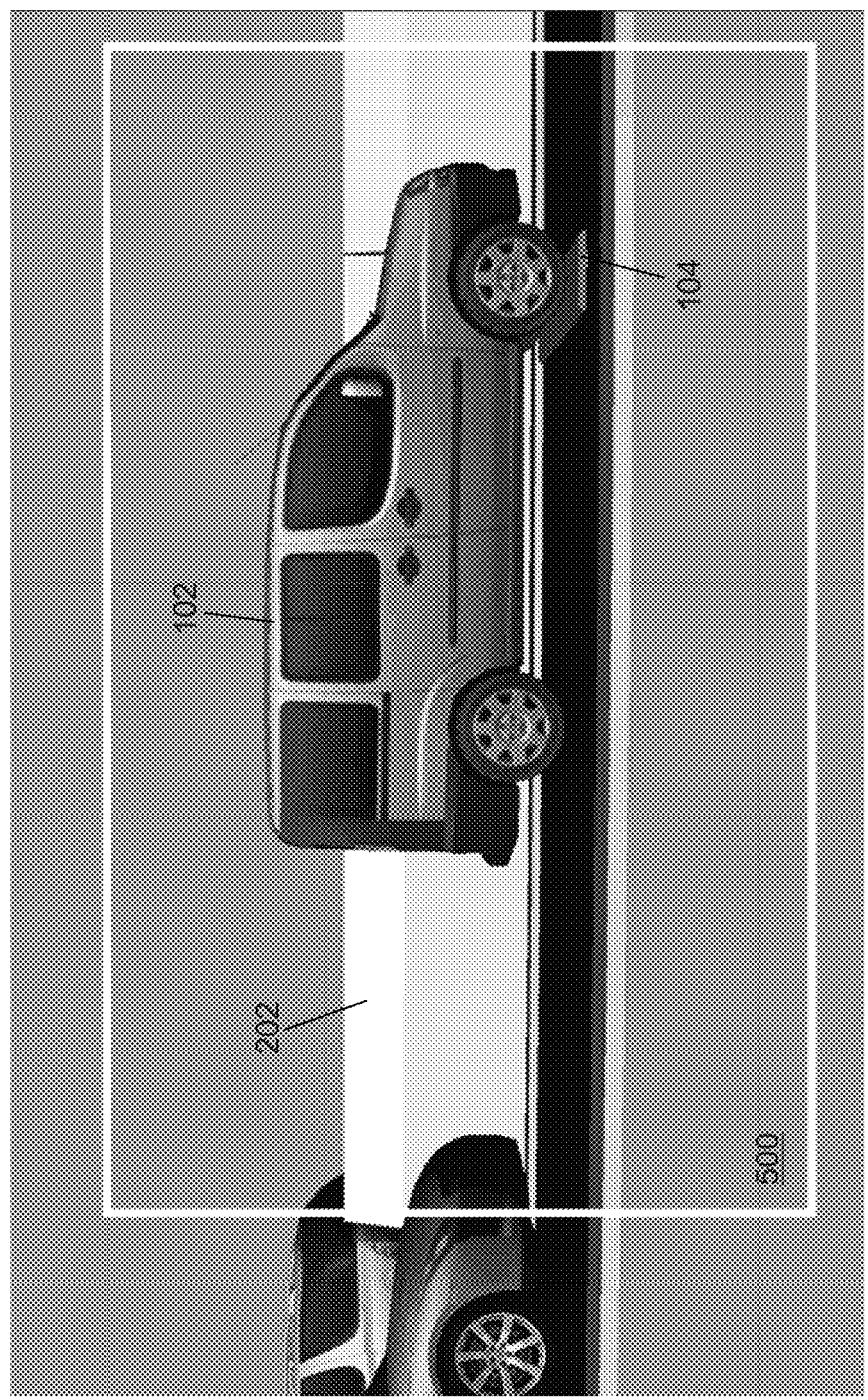
FIG. 5 depicts an example camera field of view of the vehicle alert system of FIG. 1 in accordance with an example embodiment.

In applications where a scale is to be quickly installed, an above the road WIM scale system can be used, such as scale 104 illustrated in FIG. 5. However, traditional above the road WIM scale systems suffer from poor accuracy when the vehicle speed is above approximately 6 miles per hour (mph). One problem with traditional above the road installations is that the vehicle is raised up as the wheels roll over the scale. Typically, this rise is one to two inches. So in addition to the vehicle's weight, the scale sees the forces associated with the vertical displacement of the vehicle. At 5 mph this disturbance can account for as much as 20% error in the measured vehicle weight. The errors go up dramatically as speeds increase. The accuracy of an above ground vehicle weigh-in-motion (WIM) scale may be improved by taking into consideration the vehicle's motion as the vehicle goes over the scale. Described in detail below is a WIM scale system that can be quickly installed on top of a roadway and that can maintain accuracy at higher vehicle speeds.

Figure 16:
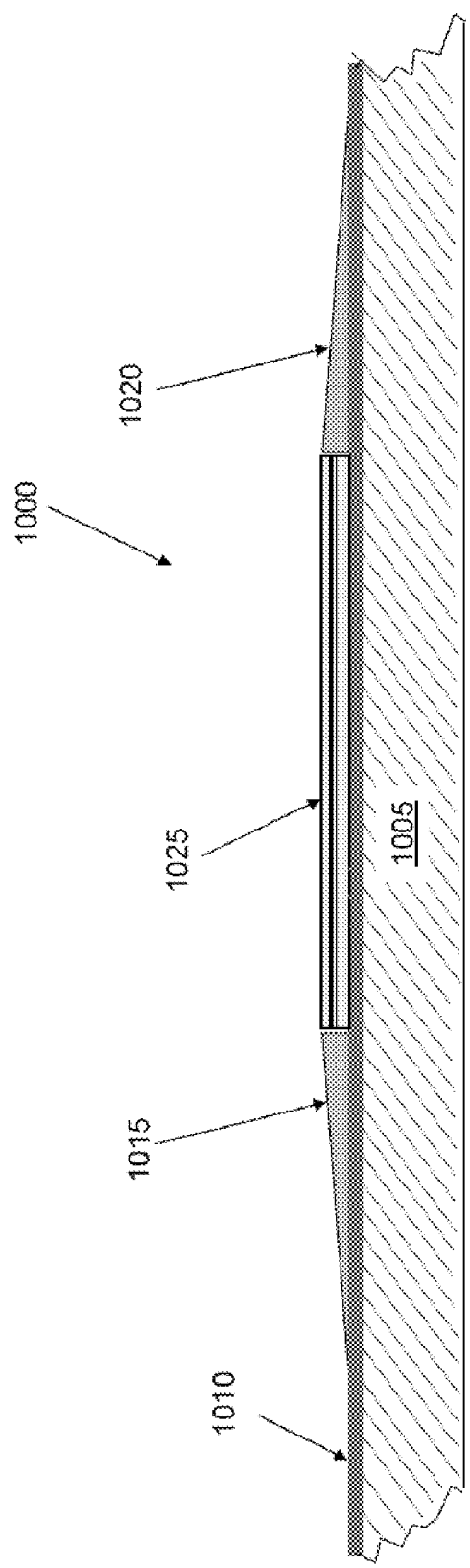
FIG. 16 is a diagram illustrating an above the road WIM scale in accordance with an illustrative embodiment.
Figure 17:
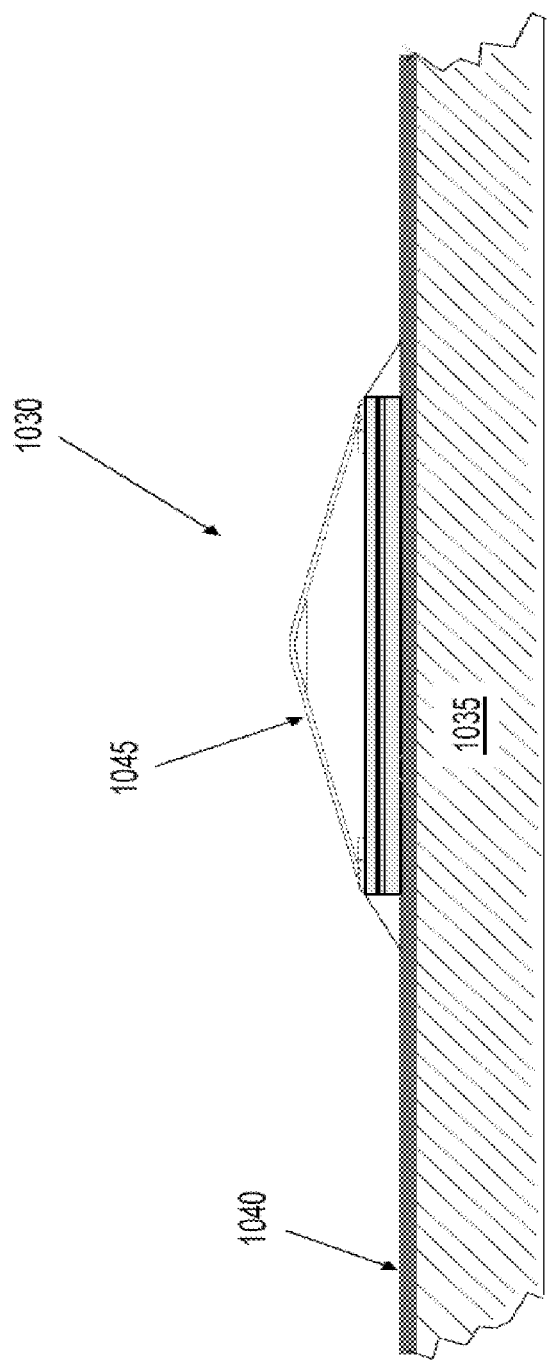
FIG. 17 is a diagram illustrating a speed bump WIM scale in accordance with an illustrative embodiment.

FIG. 16 is a diagram illustrating an above the road WIM scale 1000 in accordance with an illustrative embodiment. The above the road WIM scale 1000 is placed on a road bed 1005 that includes a road surface 1010. The above the road WIM scale 1000 includes an on ramp 1015, an off ramp 1020, and a weigh pad 1025 positioned in between the on ramp 1015 and the off ramp 1020. A vehicle approaches the above the road WIM scale 1000 using the on ramp 1015 and exits the above the road WIM scale via the off ramp 1020. The weigh pad 1025 is used to measure a weight of a vehicle as the vehicle passes over the weigh pad 1025. FIG. 17 is a diagram illustrating a speed bump WIM scale 1030 in accordance with an illustrative embodiment. The above the road WIM scale 1000 is placed on a road bed 1035 that includes a road surface 1040. The above the road WIM scale 1000 includes a speed bump weigh pad 1045 that is used to measure a weight of a vehicle as the vehicle passes over the speed bump weigh pad 1045.

Figure 18:
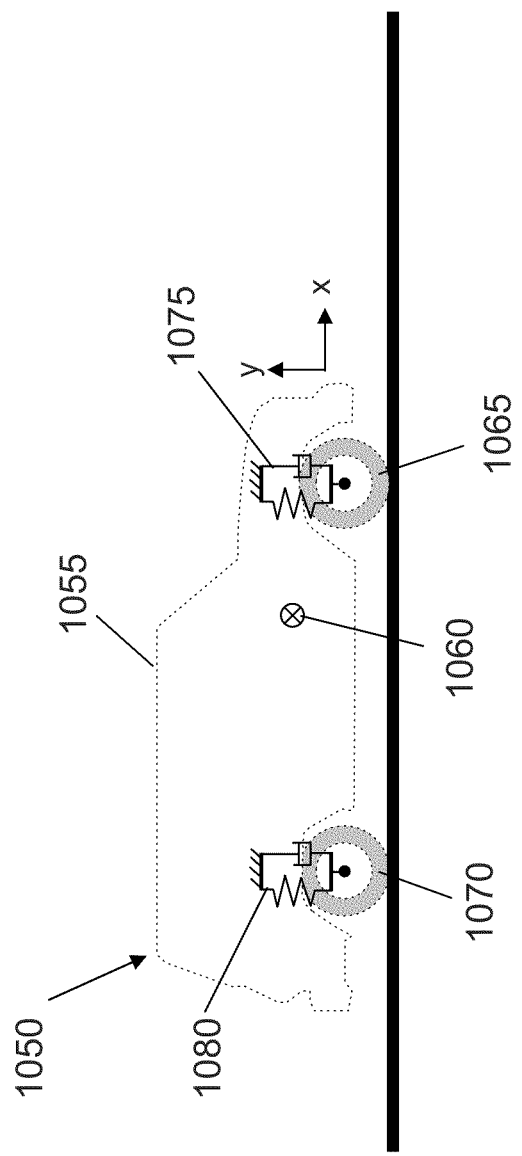
FIG. 18 is a diagram illustrating a vehicular spring-mass-damper model in accordance with an illustrative embodiment.

In an illustrative embodiment, the motion of a vehicle as the vehicle goes over an above the road WIM scale can be simulated using a spring-mass-damper model. FIG. 18 is a diagram illustrating a vehicular spring-mass-damper model 1050 in accordance with an illustrative embodiment. The vehicular model 1050 includes a chassis 1055 that has a center of gravity 1060, front wheels 1065, rear wheels 1070, front suspension 1075, and rear suspension 1080. In an illustrative embodiment, the front wheels 1065 and/or wheels 1070 can also have associated spring and damper elements. The vehicular model 1050 can be used to account for vehicle motion as the vehicle goes over an above the road WIM scale.

Figure 19:
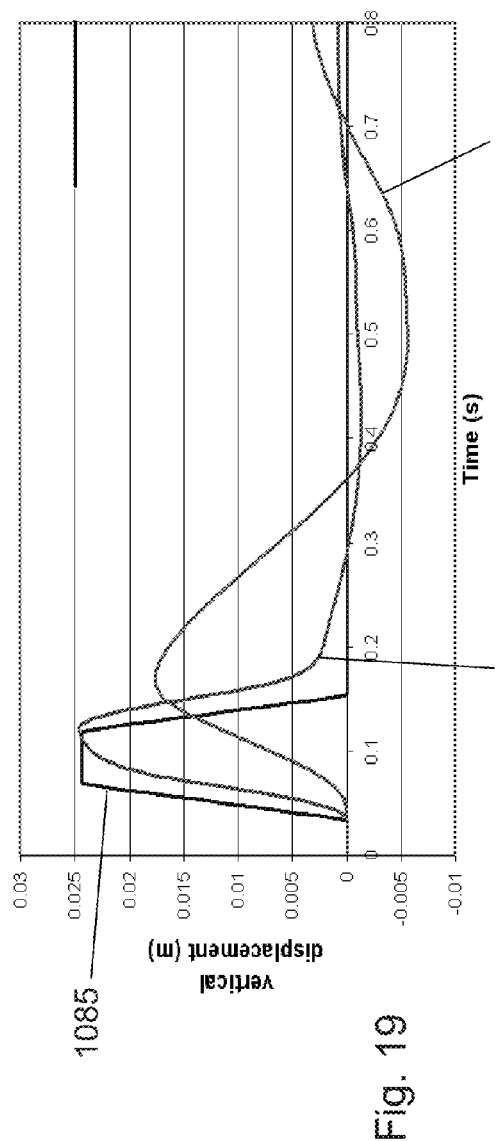
FIG. 19 is a chart illustrating the vertical displacement of a vehicle traveling over an above the road WIM scale in accordance with an illustrative embodiment.
Figure 20:
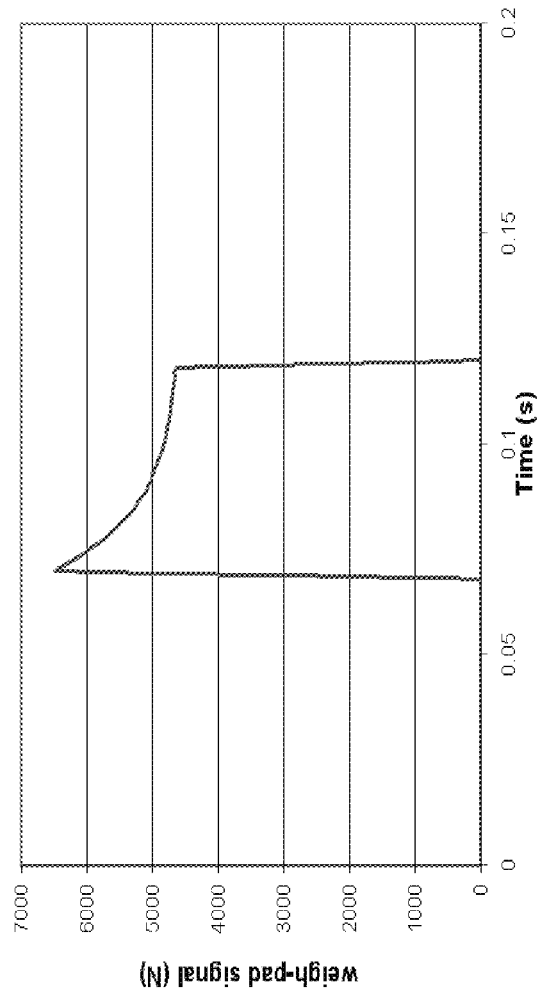
FIG. 20 is a chart illustrating the weight measured by the WIM scale of FIG. 19 as a function of time, in accordance with an illustrative embodiment.

FIG. 19 is a chart illustrating the vertical displacement of a vehicle traveling over an above the road WIM scale in accordance with an illustrative embodiment. The vertical axis of the chart illustrates the vertical displacement in meters and the horizontal axis of the chart illustrates time. A scale line 1085 in FIG. 19 illustrates a static outline or profile of an above the ground WIM scale. The scale line 1085 is included only as a reference against which the vertical displacement of the vehicle can be compared as the vehicle traverses the above the road WIM scale. A chassis line 1090 illustrates vertical displacement of a chassis of a vehicle relative to the WIM scale, and a wheel line 1095 illustrates vertical displacement of one or more wheels of the vehicle relative to the WIM scale. The information conveyed in FIG. 19 is with respect to the front axle of a sport utility vehicle (SUV) that crosses a WIM scale at 20 mph, where the top of the weigh pad is 1.125 inches above the road surface. Displacement charts can also be made based on the rear axle(s) of the vehicle and/or for different types of vehicles such as cars, trucks, semis, etc. Displacement charts can also be used to illustrate vertical displacement at different speeds and/or with different weigh pad heights above the road. As illustrated in FIG. 19, at 20 mph, the vehicle suspension absorbs the bump causing the chassis of the vehicle to rise only about 70% of the weigh pad height. FIG. 20 is a chart illustrating the weight measured by the WIM scale of FIG. 19 as a function of time, in accordance with an illustrative embodiment. As illustrated in FIG. 20, the measured weight in Newtons (N) spikes as the vehicle's vertical movement forces the vehicle upward, resulting in an increased downward force on the weigh pad. After the initial spike, the measured weight goes down as the vehicle continues traversing the weigh pad.

Figure 21:
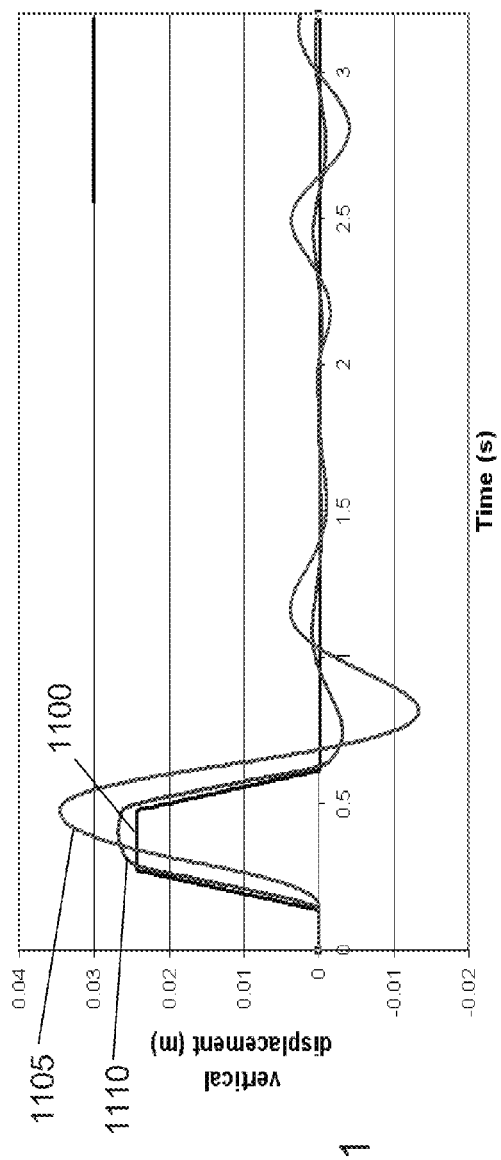
FIG. 21 a chart illustrating the vertical displacement of a vehicle traveling over an above the road WIM scale at 5 mph in accordance with an illustrative embodiment.
Figure 22:
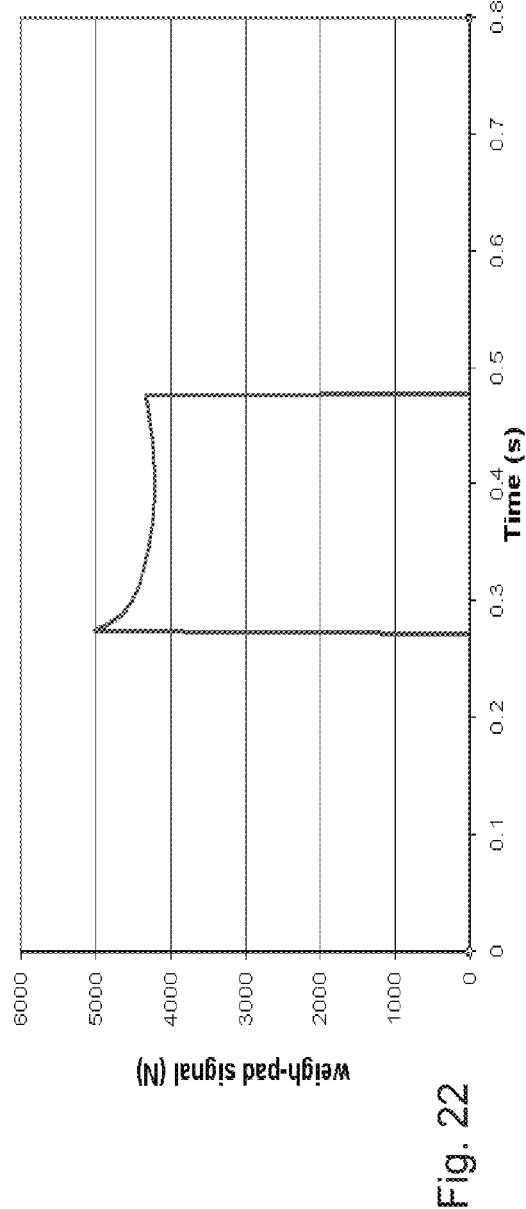
FIG. 22 is a chart illustrating the weight measured by the WIM scale of FIG. 21 as a function of time, in accordance with an illustrative embodiment.

FIG. 21 a chart illustrating the vertical displacement of a vehicle traveling over an above the road WIM scale at 5 mph in accordance with an illustrative embodiment. Similar to FIG. 19, the vertical axis of the chart illustrates the vertical displacement in meters and the horizontal axis of the chart illustrates time. A scale line 1100 in FIG. 21 illustrates a static outline or profile of an above the ground WIM scale. The scale line 1100 is included only as a reference against which the vertical displacement of the vehicle can be compared as the vehicle traverses the above the road WIM scale. A chassis line 1105 illustrates vertical displacement of a chassis of a vehicle relative to the WIM scale, and a wheel line 1110 illustrates vertical displacement of one or more wheels of the vehicle relative to the WIM scale. The information conveyed in FIG. 21 is with respect to the front axle of a sport utility vehicle (SUV) that crosses a WIM scale at 5 mph, where the top of the weigh pad is 1.125 inches above the road surface. As illustrated in FIG. 21, at 5 mph, the vehicle suspension responds to the bump such that the chassis of the vehicle rises more than the height of weigh pad (e.g., overshoot). FIG. 22 is a chart illustrating the weight measured by the WIM scale of FIG. 21 as a function of time, in accordance with an illustrative embodiment. As illustrated in FIG. 22, the measured weight spikes as the vehicle's vertical movement forces the vehicle upward, resulting in an increased downward force on the weigh pad. After the initial spike, the measured weight goes down and then starts to go back up as the vehicle continues traversing the weigh pad.

Referring again to the 20 mph weight readings from FIG. 20, the average axle weight measured by the scale is 5163.8 N, which corresponds to a mass of 527 kilograms (kg). Referring again to the 5 mph weight readings from FIG. 22, the average axle weight measured by the scale is 4342.9 N, which corresponds to a mass of 443.1 kg. The actual front axle mass of the vehicle represented in FIGS. 19-22 is 481.8 kg (e.g., this is the mass that the WIM scale would measure if the front wheels were stopped on top of the weigh pad of the WIM scale). Thus, it is clear that vehicle motion results in inaccurate and fluctuating vehicle weight measurements. Described below are algorithms and processes that can be used to help correct such fluctuations and improve the accuracy of weight measurements of vehicles in motion.

As known to those of skill in the art, Newton's Law states that F=ma, where F represents force, m represents mass, and a represents acceleration. Force can be measured in Newtons (N), mass can be measured in kilograms (kg), and acceleration can be measured in meters per second squared (m/s$^2$). In the static situation where a wheel is at rest upon a scale weigh pad, Newton's Law can be rewritten as W=mg, where W is the measured weight, m is the mass resting upon the weigh pad, and g is the acceleration of gravity (e.g., approximately 9.81 m/s$^2$). Because the value of g is constant and well known, a very accurate measure of the mass can be obtained in the static case.

If the vehicle is moving, vertical acceleration of the vehicle as the vehicle crosses the weigh pad can be accounted for using equation 2 below:

$$W=m(g+y''), \quad \text{Eq. 2}$$

where W is the measured weight, m is the mass of the vehicle, g is gravity, and vertical acceleration of the vehicle is y''. Because every action has an equal and opposite reaction, the force on the scale reacts to both gravity and the vertical acceleration of the mass. As such, if y'' can be measured as the vehicle crosses the weigh pad, the measurement of y'' can be used to improve WIM scale accuracy.

Equation 3 below can be used to estimate a mass based on equation 2:

$$\hat{m}=W/(g+y''), \quad \text{Eq. 3}$$

where $\hat{m}$ is the estimated static mass and W is the measured weight. Equation 3 can be written in terms of the estimated static weight, $\hat{W}$, as indicated in equation 4 below:

$$\hat{W}=Wg/(g+y''). \quad \text{Eq. 4}$$

Figure 23:
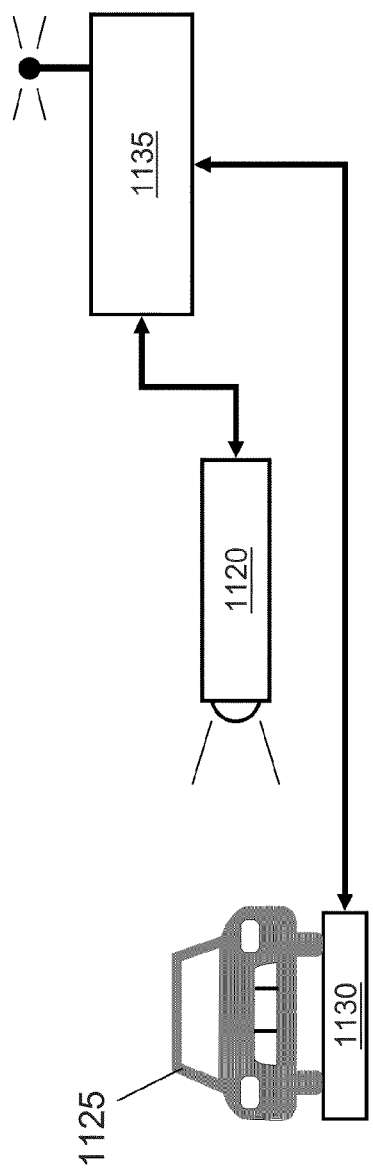
FIG. 23 is a block diagram illustrating a motion capture system in accordance with an illustrative embodiment.

In an illustrative embodiment, the vertical acceleration can be determined by analyzing video and/or images of a vehicle as the vehicle traverses an above the ground WIM scale. FIG. 23 is a block diagram illustrating a motion capture system in accordance with an illustrative embodiment. The motion capture system includes a camera 1120 that is configured to capture images and/or video of a vehicle 1125 as the vehicle 1125 goes over a WIM scale 1130. Any type of video camera or still picture camera known to those of skill in the art may be used. In an illustrative embodiment, the camera 1120 can be a video camera with a frame rate between 50 Hertz (Hz) and 500 Hz to achieve accuracy at low and high vehicle speeds. Alternatively, other frame rates may be used. In one embodiment, the camera 1120 can be capable of infrared imaging to improve the ability to capture images at night or during other low light conditions. As an example, a FLIR SC660 long wave infrared imager can be used as known to those of skill in the art. In one embodiment, a plurality of cameras can be used to capture different types of images and/or images from different perspectives. In an alternative embodiment, any other type of motion detection system known to those of skill in the art may be used instead of or in conjunction with the camera 1120. For example, pulsed laser range imaging technology may be used as known to those of skill in the art. The camera 1120 is in communication with a computing system 1135. In an illustrative embodiment, computing system 1135 can include any of the functionality and/or components discussed above with reference to computing system 108 in FIG. 3.

Figure 24:
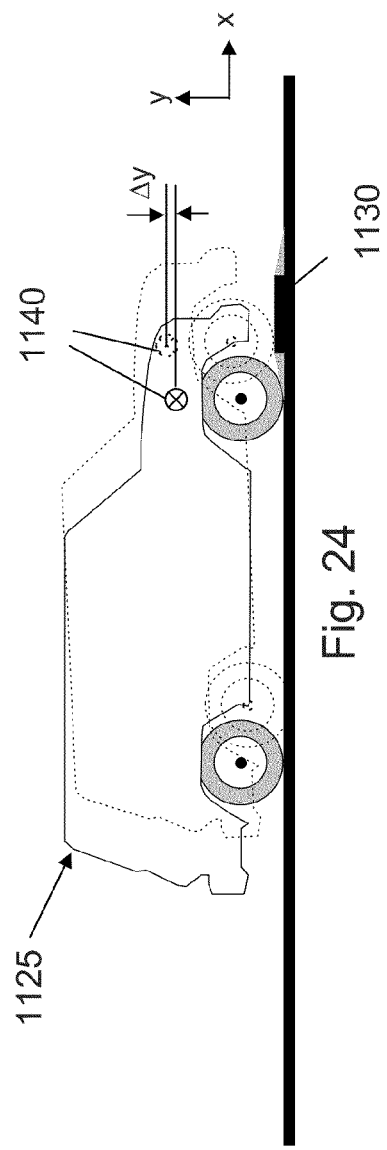
FIG. 24 is a diagram illustrating vertical displacement $\Delta y$ of a vehicle in accordance with an illustrative embodiment.

In an illustrative embodiment, the camera 1120 can be used to capture images and/or video of the vehicle 1125 crossing the WIM scale 1130. Each image and/or video frame can be associated with a timestamp as known to those of skill in the art. The computing system 1135 can be used to analyze frames of the video (or time stamped images) to determine a vertical displacement Δy of the vehicle between consecutively captured images/frames. FIG. 24 is a diagram illustrating vertical displacement Δy of the vehicle 1125 in accordance with an illustrative embodiment. In FIG. 24, a first position of the vehicle 1125 is illustrated by a solid line and a second position of the vehicle 1125 is illustrated by a dashed line. In an illustrative embodiment, the first position can be captured in a first video frame/image of the vehicle 1125 and the second position can be captured in a second video frame/image of the vehicle 1125. The vertical displacement is determined relative to a reference point 1140 on the vehicle 1125 as the vehicle goes over the WIM scale 1130. As illustrated in FIG. 24, the reference point 1140 is on the chassis of the vehicle 1125. Alternatively, the reference point 1140 may be on a wheel of the vehicle 1125. The vertical displacement relative to the reference point 1140 can be determined using any image/video analysis techniques known to those of skill in the art.

In an illustrative embodiment, the image/video processing can be implemented in three stages, including feature tracking, noise reduction, and curve fitting. In alternative embodiments, fewer, additional, and/or different stages may be used. Any feature tracking algorithm known to those of skill in the art may be used. Examples of such feature tracking algorithms include the Kanade-Lucas-Tomasi (KLT) algorithm, the Features from the Accelerated Segment Test (FAST) algorithm, PatchMatch algorithms, etc. Each of these algorithms is capable of detecting a set of features that exist in two separate images and identifying a transformation of each feature from the first image to the second image. In an illustrative embodiment, the feature tracking stage of the image processing takes two consecutively captured images or frames of a video sequence and creates a set of features with corresponding transformations.

The noise reduction stage of image processing is used to eliminate outlier features which do not follow the same trend as the majority of features. There are several algorithms for eliminating outlier features such as the Kalman filter, RANdom Sample Consensus (RANSAC) algorithms, etc. After elimination of the outlier features via a noise reduction algorithm, each remaining feature in an image or set of images can be classified as: i) a stationary, background feature that moves/changes very little between 2 frames, ii) a translating, chassis feature that moves horizontally or vertically with little or no rotation, or iii) a rotating, translating, wheel feature that rotates about a translating point. Because they are not moving, the stationary, background features can be eliminated from consideration during the remainder of the image processing.

Once the classification process is completed, the transformations between the two frames for each translating, chassis feature is combined to produce an overall chassis transformation between the two images. Similarly, the rotating, translating transformations can be combined to produce an overall rotational transformation between the two images. The chassis transformations and rotational transformations for each subsequent pair of consecutively captured images/frames can also be determined. For example, a first chassis transformation and a first rotational transformation can be determined between frame 1 and frame 2, a second chassis transformation and a second rotational transformation can be determined between frame 2 and frame 3, a third chassis transformation and a third rotational transformation can be determined between frame 3 and frame 4, etc. The sequence of chassis and rotational transformations describe the paths, or curves, that the chassis and/or other vehicle portion takes as an axle of the vehicle traverses a WIM scale.

In an illustrative embodiment, the sequences of transformations can be plotted and adjusted using any curve fitting algorithms known to those of skill in the art. One curve based on the sequence of chassis transformations can correspond to vertical displacement of a reference point of the chassis between frames. The curve can be plotted as a function of time such that the curve can be used to determine velocity and acceleration of the chassis. Another curve can be used to represent horizontal displacement of a reference point of the chassis, and the horizontal displacement curve can be used to determine horizontal acceleration (or deceleration) as described in more detail below. Another curve can be used to represent vertical displacement of a reference point of a wheel of the vehicle, and a vertical displacement curve of the wheel can be used to determine vertical acceleration of the wheel as described in more detail below. Similarly, a curve based on rotational transformations can be used to determine rotational acceleration.

In an illustrative embodiment, the vertical velocity $v_y$ of the vehicle can be determined by dividing the vertical displacement $\Delta y$ by $\Delta t$, where $\Delta t$ is the amount of time between the vertical displacement measurements that result in the vertical displacement $\Delta y$. The vertical displacement can be obtained from a fitted vertical displacement curve as described above, or from actual vertical displacements that are determined based on the processing of consecutive images/frames. The vertical acceleration y" can be determined by dividing a change in the vertical velocity $\Delta v_y$ of the vehicle by $\Delta t$, where $\Delta t$ is the amount of time between the vertical velocity measurements that result in the change in vertical velocity $\Delta v_y$. In an illustrative embodiment, the same $\Delta t$ (e.g., the same time period) can be used as the basis for the determination of both vertical velocity and vertical acceleration. In an embodiment where the vertical displacement is plotted as a function of time using a curve fitting algorithm, the vertical velocity can be obtained from the vertical displacement curve by plotting the slope of the vertical displacement curve as a function of time. Similarly, the vertical acceleration can be obtained from the vertical velocity curve by plotting the slope of the vertical velocity curve as a function of time.

In an alternative embodiment, the vertical velocity and vertical acceleration may be determined based on the image analysis without plotting curves. As an example, a first pair of consecutively captured frames/images (e.g., image 1 and image 2) can be analyzed to determine a first vertical displacement and a first velocity of the vehicle, and a second pair of images (e.g., image 2 and image 3) can be analyzed to determine a second vertical displacement and second velocity of the vehicle. The difference between the first and second velocity can be $\Delta v_y$, and $\Delta v_y$ can be used along with the appropriate $\Delta t$ to determine vertical acceleration y". Similarly, the second pair of images (e.g., image 2 and image 3) can be analyzed along with a third pair of images (e.g., image 3 and image 4) to determine a second $\Delta v_y$ (which can be used to determine a second y"), and so on. As such, a plurality of vertical acceleration determinations can be made as the vehicle goes over the WIM scale.

Figure 25:
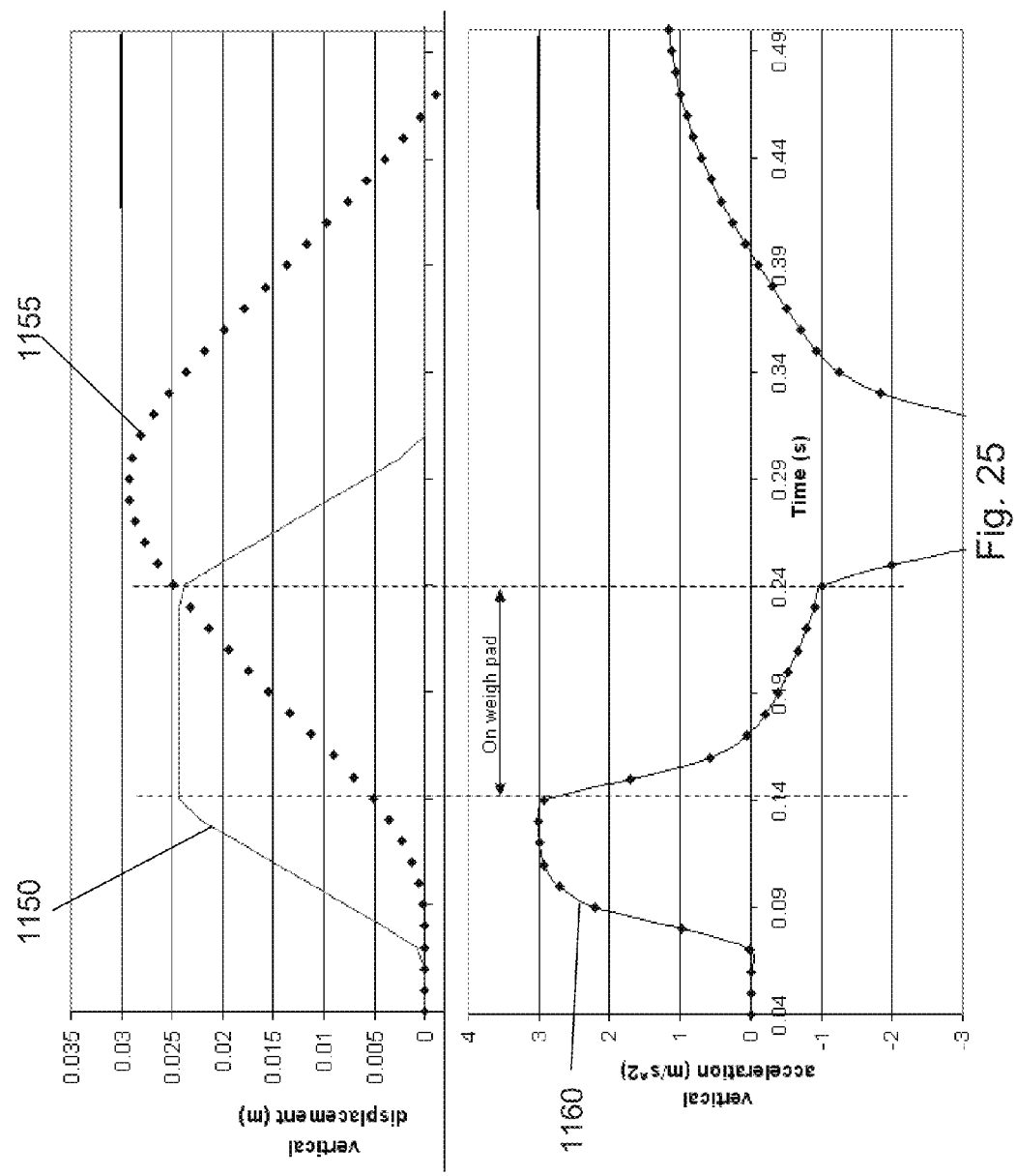
FIG. 25 is a chart illustrating vertical displacement and acceleration as a function of time in accordance with an illustrative embodiment.

The determined vertical acceleration y" can be used along with the measured weight W and equation 4 above to determine the estimated static weight $\hat{W}$. The estimated static weight $\hat{W}$ is an estimated weight of one axle of the vehicle during the time period $\Delta t$. FIG. 25 is a chart illustrating vertical displacement and acceleration as a function of time in accordance with an illustrative embodiment. The top portion of FIG. 25 includes a scale line 1150 that illustrates a static outline of an above the ground WIM scale. The scale line 1150 is included only as a reference to illustrate the vertical displacement of the vehicle (relative to the WIM scale) as the vehicle traverses the above the road WIM scale. The top portion of FIG. 25 also includes a chassis line 1155 that illustrates vertical displacement of a chassis of a vehicle relative to the WIM scale. The bottom portion of FIG. 25 includes an acceleration line 1160 that illustrates the determined vertical acceleration of the vehicle as a function of time. The vertical dashed lines that are in both the upper and lower portions of FIG. 25 illustrate the duration of time that the vehicle is on the weigh pad of the WIM scale. The calculations illustrated in FIG. 25 are for the front end of a vehicle that passes over the weigh pad of WIM scale at 10 mph. Similar calculations can also be performed for additional axles of the vehicle.

Figure 26:
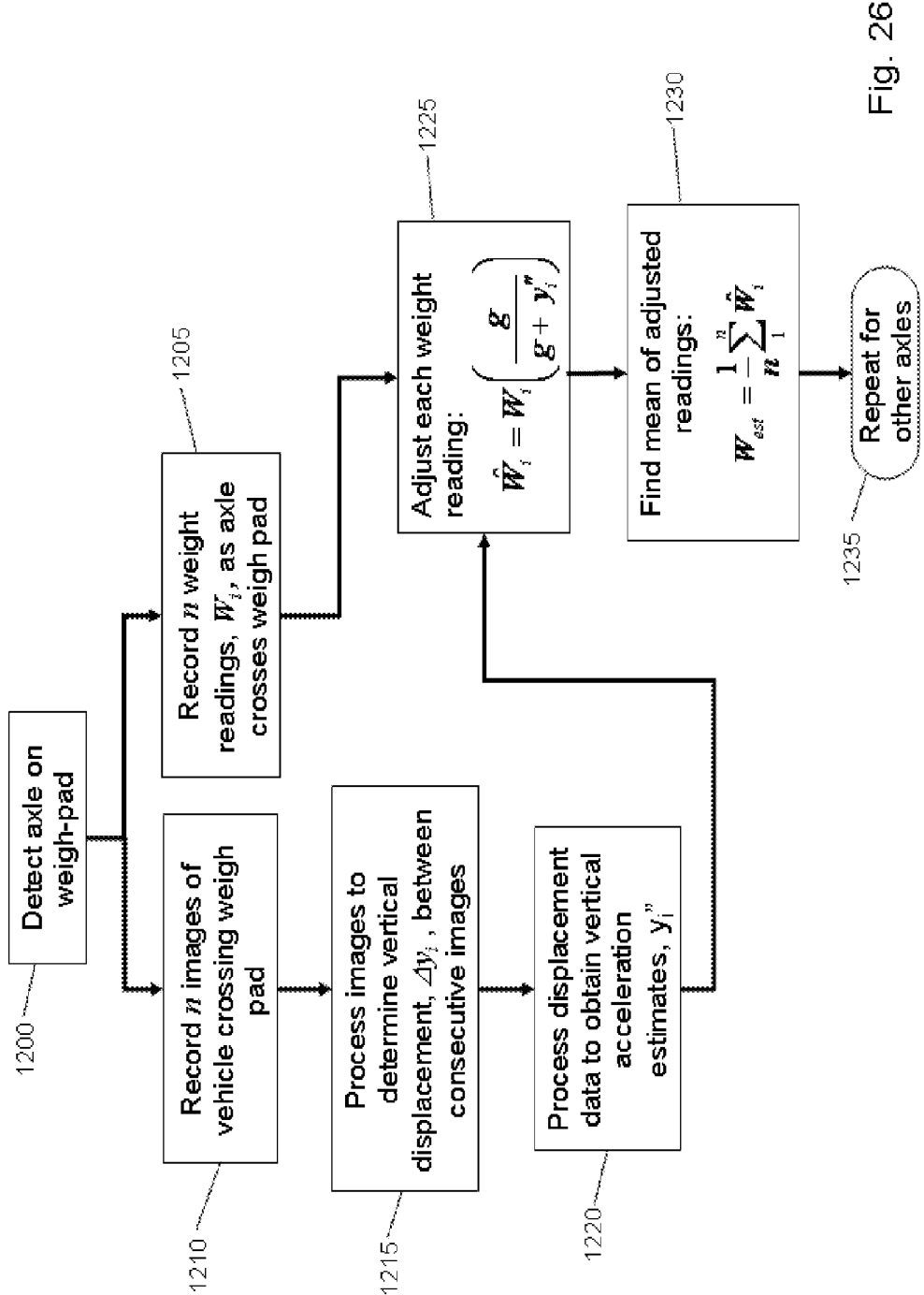
FIG. 26 is a flow diagram illustrating operations performed to estimate static vehicular weight of a moving vehicle in accordance with an illustrative embodiment.

FIG. 26 is a flow diagram illustrating operations performed to estimate static vehicular weight of a moving vehicle in accordance with an illustrative embodiment. In alternative embodiments, fewer, additional, and/or different operations may be performed. Also, the use of flow diagrams is not intended to be limiting with respect to the order of operations performed. In an operation 1200, an axle is detected on a weigh pad of a WIM scale. The axle can be detected based on an initial detection of weight on the WIM scale, based on captured video and/or images of a vehicle that is approaching the WIM scale, etc. In an operation 1205, n weight measurements $W_i$ are captured by the WIM scale as the detected axle crosses the weigh pad of the WIM scale. In an illustrative embodiment, each of the n weight measurements is time stamped or otherwise associated with a time that the weight measurement was made.

In an operation 1210, n frames (or images) are captured as the detected axle goes over the weigh pad of the WIM scale. In an illustrative embodiment, each of the n images is captured at the same time as the corresponding n weight measurements are made in operation 1205. In an operation 1215, the n images are processed to determine vertical displacement of at least a portion of the vehicle (e.g., a reference point) between consecutive images. In an operation 1220, the vertical displacement is processed to determine vertical acceleration. The vertical displacement is processed along with an amount of elapsed time between the consecutive images upon which the vertical displacement is based to determine a vertical velocity over the elapsed time. A difference between consecutively determined vertical velocities can be used along with the elapsed time between the determined vertical velocities to determine vertical acceleration. In an illustrative embodiment, the vertical velocities and accelerations can be determined based on a plotted curve of the vertical displacement as described above. Alternatively, any other methods may be used to determine the vertical velocities and/or the vertical accelerations.

In an operation 1225, the n weight readings captured in operation 1205 are adjusted using the determined vertical acceleration estimates and equation 4. In an operation 1230, the adjusted weight readings are averaged using equation 5 below to determine an estimated weight for the axle:

$$W_{est} = \frac{1}{n}\sum_{1}^{n} \hat{W}_i, \qquad \text{Eq. 5}$$

where $W_{est}$ is the estimated weight for the axle. The process of FIG. 26 is repeated for one or more additional axles of the vehicle in an operation 1235.

Table 1 below illustrates, for both a front axle and a rear axle of a vehicle, averaged weight readings and averaged motion compensated weight readings for the vehicle travelling at 0 mph, 5 mph, and 20 mph. As indicated in the table, the motion compensated readings are significantly more accurate than the actual weight measurements when the vehicle is in motion.

TABLE 1

Performance comparison using motion compensated WIM measurements

| | Front Axle | | | Rear Axle | | |
|---|---|---|---|---|---|---|
| | Weight (N) | Mass (kg) | Error (%) | Weight (N) | Mass (kg) | Error (%) |
| | 0 mph (static) | | | | | |
| averaged weight readings | 4722 | 481.8 | 0.0% | 5612 | 572.7 | 0.0% |
| ave. motion compensated readings | 4722 | 481.8 | 0.0% | 5612 | 572.7 | 0.0% |
| | 5 mph | | | | | |
| averaged weight readings | 4343 | 443.2 | −8.0% | 5334 | 544.3 | −5.0% |
| ave. motion compensated readings | 4769 | 486.6 | 1.0% | 5635 | 575 | 0.4% |
| | 20 mph | | | | | |
| averaged weight readings | 5164 | 526.9 | 9.4% | 6167 | 629.3 | 9.9% |
| ave. motion compensated readings | 4611 | 470.5 | −2.4% | 5687 | 580.3 | 1.3% |

In one embodiment, vertical displacement of a wheel of a vehicle can be used along with vertical displacement of a chassis of the vehicle to help improve the determination of axle weight. It has been determined that, as the axle passes over the weigh-pad, the vertical acceleration experienced by the wheel is significantly greater than the chassis vertical acceleration. This is due at least in part to the vehicle's suspension absorbing the disturbance. As such, the weight estimate may be improved by also measuring the vertical acceleration of the wheel independent of chassis vertical acceleration and factoring at least a portion of the vertical wheel acceleration into the weight compensation equation. As such, the image processing can process vertical displacement using two reference points, one on the chassis, and one on a wheel that is crossing the WIM scale. The image processing and form fitting techniques described above can be used to produce separate measures of the wheel and chassis vertical accelerations, $y_w''$ and $y_c''$, respectively. Equation 4 can be modified as indicated below in equation 6 to account for both wheel and chassis vertical acceleration in determining the estimated static weight:

$$\hat{W} = \frac{Wg}{g + \beta y_w'' + (1-\beta)y_c''},\quad \text{Eq. 6}$$

where $\hat{W}$ is an estimated weight, W is a measured weight, g is gravity, $y_w''$ is the vertical acceleration of the wheel, $y_c''$ is the vertical acceleration of the chassis, and β is an unsprung vehicle mass ratio. In an illustrative embodiment, β can be determined by dividing the unsprung mass (e.g., the mass of the wheel, brake assembly, and lower suspension structure of the vehicle) of the vehicle by the sprung mass (e.g., the total vehicle mass less the unsprung mass) of the vehicle. In general, the unsprung mass of a vehicle is typically between 5% and 10% of the total vehicle mass, resulting in β values of between approximately 0.05/0.95=0.05 and 0.10/0.90=0.11. In an illustrative embodiment, the system can use a constant value of 0.07 for β. Alternatively, other values of β may be used such as 0.04, 0.06, 0.075, 0.90, 0.12, etc. In another alternative embodiment, β may be calculated on the fly based on known sprung and unsprung masses of a specific type of vehicle. In such an embodiment, the system can be configured to identify the vehicle make, model, etc. before, during, or after the vehicle crosses the weigh pad. In another alternative embodiment, the β value for a specific vehicle can be accessed from a database or other storage repository of β values.

In another embodiment, horizontal acceleration/deceleration can also be taken into consideration to help improve the determination of axle weight in a moving vehicle. The horizontal acceleration can be determined similar to the vertical acceleration described above. Video frames or images of a vehicle crossing a weigh pad can be captured as described above, and image processing techniques can be used to determine a horizontal displacement Δx relative to a reference point on a chassis or other portion of a vehicle. The image processing techniques can also be used to obtain a length of the wheel base of the vehicle and a height of the center of gravity of the vehicle. Alternatively, the system can be configured to identify the make, model, etc. of the vehicle, and the wheel base length and/or the height of the center of gravity can be accessed from a database or other storage repository.

Figure 27:
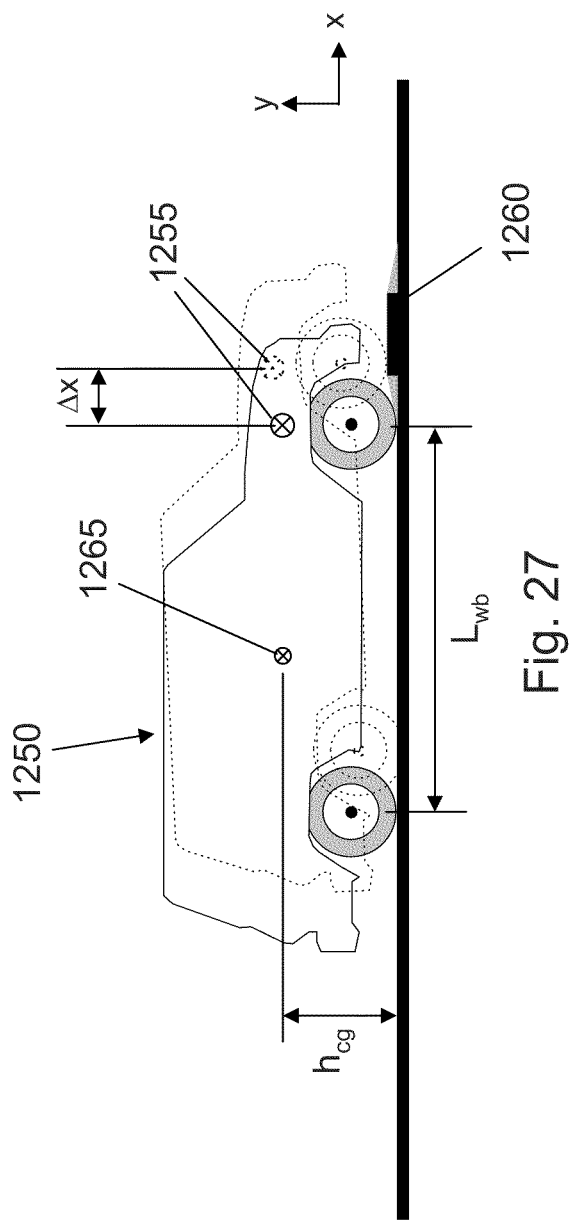
FIG. 27 is a diagram illustrating horizontal displacement $\Delta x$ of a vehicle in accordance with an illustrative embodiment.

FIG. 27 is a diagram illustrating horizontal displacement Δx of a vehicle 1250 in accordance with an illustrative embodiment. In FIG. 27, a first position of the vehicle 1250 is illustrated by a solid line and a second position of the vehicle 1250 is illustrated by a dashed line. In an illustrative embodiment, the first position can be captured in a first video frame or image of the vehicle 1250 and the second position can be captured in a second video frame or image of the vehicle 1250. The horizontal displacement is determined relative to a reference point 1255 on the vehicle 1250 as the vehicle goes over a WIM scale 1260. As illustrated in FIG. 27, the reference point 1255 is on the chassis of the vehicle 1250. Alternatively, the reference point 1255 may be on a wheel of the vehicle 1250. The horizontal displacement relative to the reference point 1255 can be determined using any image/video processing techniques known to those of skill in the art. The image/video processing techniques can also be used to determine a length of a wheel base of the vehicle $L_{wb}$ and a height ($h_{cg}$) of a center of gravity 1265 of the vehicle 1250. As indicated above, in an alternative embodiment, the system may use predetermined stored values for $L_{wb}$ and $h_{cg}$.

In an illustrative embodiment, the horizontal velocity $v_x$ of the vehicle 1250 can be determined by dividing the horizontal displacement Δx by Δt, where Δt is the amount of time between the horizontal displacement measurements that result in the horizontal displacement Δx. The horizontal displacement can be obtained from a fitted horizontal displacement curve as described above, or from actual horizontal displacements that are determined based on the processing of consecutive images/frames. In an alternative embodiment, the horizontal velocity can be determined using any other type of velocity detection system (e.g., radar, etc.) known to those of skill in the art. The horizontal acceleration x" can be determined by dividing a change in the horizontal velocity $\Delta v_x$ of the vehicle by Δt, where Δt is the amount of time between the horizontal velocity measurements that result in the change in horizontal velocity $\Delta v_x$. In an illustrative embodiment, the same Δt (e.g., the same time period) can be used as the basis for the determination of both horizontal velocity and horizontal acceleration. In an embodiment where the horizontal displacement is plotted as a function of time using a curve fitting algorithm, the horizontal velocity can be obtained from the horizontal displacement curve by plotting the slope of the horizontal displacement curve as a function of time. Similarly, the horizontal acceleration can be obtained from the horizontal velocity curve by plotting the slope of the horizontal velocity curve as a function of time. In an alternative embodiment, the horizontal velocity and horizontal acceleration may be determined based on the image analysis without plotting curves as described above with reference to vertical velocity and acceleration.

Based on the determined horizontal acceleration, equations 7 and 8 below can be used to determine the force measured on the weigh pad for both the front and rear axles of the vehicle, respectively:

$$\Delta F_{front} = -\frac{m_{cg} x'' h_{cg}}{L_{wb}} \qquad \text{Eq. 7}$$

$$\Delta F_{rear} = \frac{m_{cg} x'' h_{cg}}{L_{wb}}, \qquad \text{Eq. 8}$$

where $\Delta F_{front}$ is the additional force (N) on the weigh pad due to horizontal acceleration of the front axle as the front axle crosses the weigh pad, $\Delta F_{rear}$ is the additional force (N) on the weigh pad due to horizontal acceleration of the rear axle as the rear axle crosses the weigh pad, $m_{cg}$ is the total sprung vehicle mass (kg), $x''$ is the horizontal acceleration (m/s$^2$), $h_{cg}$ is the height of the center of gravity of the vehicle above the road (m), and $L_{wb}$ is the length of the wheelbase of the vehicle (m).

Based on the assumption that $m_{cg}$ is evenly distributed between the front and rear axles, equation 7 can be combined with equation 4 and rewritten as equation 9 below:

$$\hat{W}_f \cong W\left[\frac{g}{g + y'' - \frac{2x'' h_{cg}}{L_{wb}}}\right], \qquad \text{Eq. 9}$$

where $\hat{W}_f$ is the estimated static weight of the front axle, g is gravity, $y''$ is vertical acceleration, $x''$ is horizontal acceleration, $h_{cg}$ is the height of the center of gravity of the vehicle, and $L_{wb}$ is the length of the wheel base of the vehicle. Similarly, equation 8 can be combined with equation 4 and rewritten as equation 10 below:

$$\hat{W}_r \cong W\left[\frac{g}{g + y'' + \frac{2x'' h_{cg}}{L_{wb}}}\right], \qquad \text{Eq. 10}$$

where $\hat{W}_r$ is the estimated static weight of the rear axle, g is gravity, $y''$ is vertical acceleration, $x''$ is horizontal acceleration, $h_{cg}$ is the height of the center of gravity of the vehicle, and $L_{wb}$ is the length of the wheel base of the vehicle. In an embodiment, where both vertical chassis acceleration and vertical wheel acceleration are taken into consideration, the $y''$ variable in equations 9 and 10 can be replaced by $\beta y''_w + (1-\beta) y''_c$ as discussed above with respect to equation 6. The process for using the horizontal acceleration to improve accuracy of the weight determination can be similar to the process described with reference to FIG. 26 regarding vertical acceleration. Simulation of the horizontal acceleration indicates that, even with 50% more load on the rear axle (which perturbs the assumption of even mass distribution across axles), compensating for horizontal acceleration using equations 9 and 10 can improve the weight estimate by a factor of 4.

Figure 28:
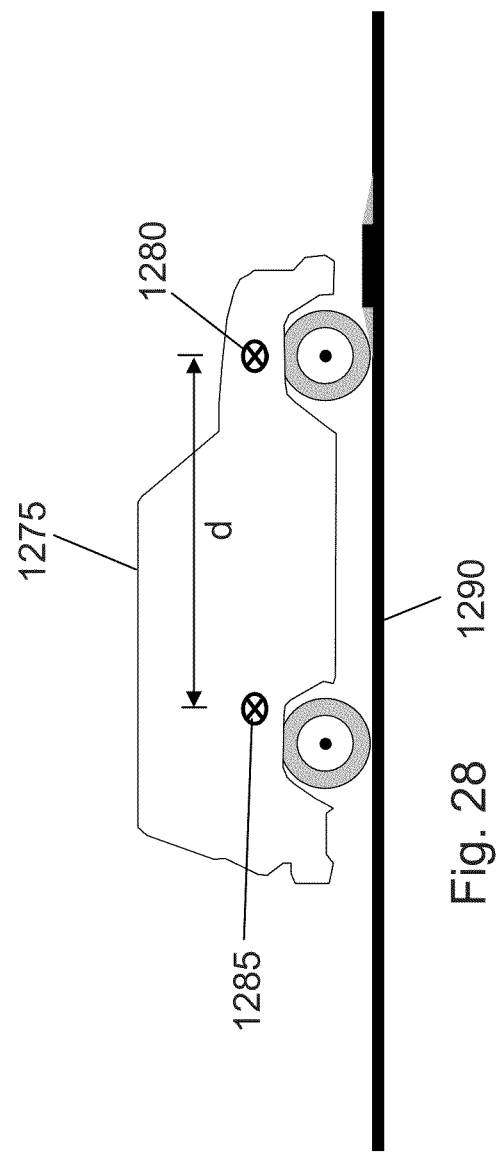
FIG. 28 is a diagram illustrating a vehicle with a first reference point and a second reference point in accordance with an illustrative embodiment.

In one embodiment, pitch axis displacement of a vehicle can also be used to help determine the axle weight(s) of the vehicle. In an illustrative embodiment, the pitch axis (or angular) acceleration θ" can be determined based on a difference between vertical accelerations at two different reference points of the vehicle. FIG. 28 is a diagram illustrating a vehicle 1275 with a first reference point 1280 and a second reference point 1285 in accordance with an illustrative embodiment. In one embodiment, the first reference point 1280 and the second reference point 1285 are at substantially the same elevation above a road 1290 that the vehicle 1275 is on, and are separated by at least one half of a length of the vehicle 1275. In an alternative embodiment, the two reference points may be at different elevations and/or closer than one half of the length of the vehicle. The first reference point 1280 can be used as the basis for determining a first vertical acceleration $y''_{c1}$ and the second reference point 1285 can be used as the basis for determining a second vertical acceleration $y''_{c2}$. The first and second vertical accelerations can be determined using any of the methods described herein or otherwise known to those of skill in the art. A horizontal distance d between the first and second reference points can also be determining using the above-described image processing techniques. Upon determination of $y''_{c1}$, $y''_{c2}$, and d, equation 11 below can be used to determine the pitch axis (or angular) acceleration θ":

$$\theta'' \cong \frac{y''_{c1} - y''_{c2}}{d}. \qquad \text{Eq. 11}$$

The angular acceleration can be used along with equation 12 below to help improve the weight determination:

$$\hat{W} \cong \frac{Wg}{g + \beta y''_w + (1-\beta) y''_c + \frac{k^2 \theta''}{L_{wb}}}, \qquad \text{Eq. 12}$$

where $\hat{W}$ is an estimated weight, W is a measured weight, g is gravity, $y''_w$ is vertical acceleration of the wheel, $y''_c$ is vertical acceleration of the chassis, β is the unsprung mass ratio of the vehicle, $L_{wb}$ is the length of the wheel base of the vehicle, θ" is the angular acceleration, and k is the chassis radius of gyration. The chassis radius of gyration, k, can be measured in meters (m) and can represent the locations of masses in the chassis (e.g., k is the root mean squared value of the distances of masses from the center of gravity of the chassis). Vehicles typically have a chassis radius of gyration that is approximately 30% of the length of the wheelbase of the vehicle. As such, in one embodiment, k can be treated as a constant having a value of $0.3L_{wb}$. In such an embodiment, equation 12 can be rewritten as follows:

$$\hat{W} \cong \frac{Wg}{g + \beta y''_w + (1-\beta) y''_c + .09 L_{wb}}. \qquad \text{Eq. 13}$$

In an alternative embodiment, other constant values of k such as $0.2L_{wb}$, $0.25L_{wb}$, $0.35L_{wb}$, $0.40L_{wb}$, etc. may be used. In another alternative embodiment, k may be determined independently for each vehicle based on the vehicle type, etc. In one embodiment, the value of $(2x'' h_{cg})/L_{wb}$ can be subtracted from the denominator of equations 12 or 13 to also account for horizontal acceleration of the front axle. Similarly, the value of $(2x'' h_{cg})/L_{wb}$ can be added to the denominator of equations 12 or 13 to also account for horizontal acceleration of the rear axle. The process for using the angular acceleration to improve accuracy of the weight determination can be similar to the process described with reference to FIG. 26 regarding vertical acceleration.

Because the vertical acceleration, horizontal acceleration, and/or angular acceleration of the vehicle are determined and factored into the weight estimates, the need to use a low profile weigh pad design is greatly reduced. This allows other design such as the speed bump WIM scale 1030 illustrated with reference to FIG. 17 to be used at speeds of 12 mph or more. Without compensating for vehicle dynamics, the weight readings from this type of weigh pad would be unusable at speeds over approximately 2 mph. The speed bump WIM scale 1030 may be useful in situations where traffic speeds need to be limited (typical speed bump function) or when a covert weigh pad design is desired.

Figure 29:
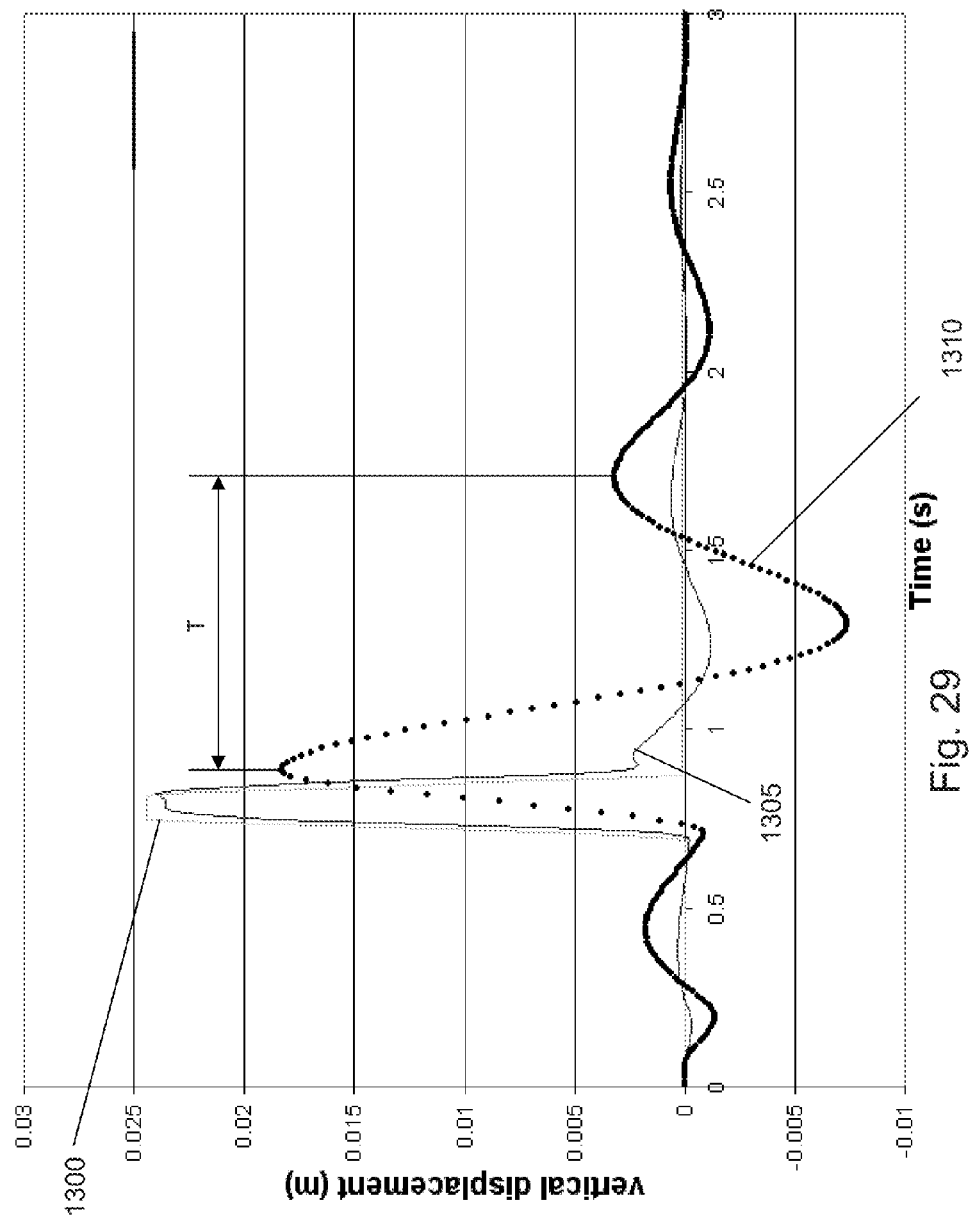
FIG. 29 is a chart illustrating the period of oscillation r of the rear suspension of a vehicle in accordance with an illustrative embodiment.

In one embodiment, the vertical displacement data calculated by the system may also be used to measure a period of oscillation ($\tau$) of the suspension of the vehicle. The period of oscillation of the suspension can refer to the amount of time between peaks on a plot of vertical displacement of a chassis of the vehicle. FIG. 29 is a chart illustrating the period of oscillation $\tau$ of the rear suspension of a vehicle in accordance with an illustrative embodiment. In FIG. 29, a profile of the weigh pad is represented by a line 1300, vertical displacement of a wheel of the vehicle is represented by a line 1305, and vertical displacement of the chassis of the vehicle is represented by a dotted line 1310. The natural frequency of the suspension $\omega_n$ can be determined by taking the inverse of the period of oscillation $\tau$. Passenger vehicles typically have a natural frequency of suspension $\omega_n$ that is between 1.0 and 1.5 Hertz (Hz). Natural frequencies of suspension which fall outside of this range may indicate that the suspension of the vehicle has been modified to carry large loads without a noticeable suspension sag. As such, a natural frequency which falls outside of a predetermined range can be used to alert a system administrator, the authorities, etc. that a given vehicle may be trying to conceal a large load.

Although many of the examples above describe vehicle motion compensation for use in conjunction with above the ground weigh pads, compensating for vehicle dynamics may also be used to increase the accuracy of permanent, flush-mounted weigh-in-motion systems. Even with carefully installed weigh pads, there is often vertical acceleration that occurs while a vehicle travels over the weigh pad, particularly at high speed. More importantly, horizontal acceleration/deceleration caused by vehicles that are accelerating/braking while on the weigh pad may greatly impact the readings. By determining the vertical acceleration, horizontal acceleration, and/or angular acceleration, the weight readings may be compensated to improve the static weight estimate even though the weigh pad itself may cause little or no disturbance.

The word "example" is used herein to mean serving as an example, instance, or illustration. Any aspect or design described herein as "example" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise. The example embodiments may be implemented as a method, apparatus, or article of manufacture using standard programming and/or engineering techniques to produce software, firmware, hardware, or any combination thereof to control a computer to implement the disclosed embodiments.

The foregoing description of example embodiments have been presented for purposes of illustration and of description. It is not intended to be exhaustive or to limit the invention to the precise form disclosed, and modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system comprising:
   a camera configured to capture images of a vehicle as the vehicle goes over a weigh-in-motion scale;
   the weigh-in-motion scale configured to generate one or more weight measurements of the vehicle as the vehicle goes over the weigh-in-motion scale; and
   a processor operatively coupled to the camera and the weigh-in-motion scale, wherein the processor is configured to:
      determine a plurality of accelerations of at least a portion of the vehicle based at least in part on the images of the vehicle captured by the camera, wherein each of the plurality of accelerations corresponds in time to a weight measurement of the one or more weight measurements; and
      adjust each of the one or more weight measurements based on a corresponding acceleration.

2. The system of claim 1, wherein at least one of the plurality of accelerations comprises a vertical acceleration of a chassis of the vehicle.

3. The system of claim 1, wherein at least one of the plurality of accelerations comprises a vertical acceleration of a wheel of the vehicle.

4. The system of claim 1, wherein at least one of the plurality of accelerations comprises a first vertical acceleration of a chassis of the vehicle, wherein the processor is further configured to determine a second vertical acceleration of a wheel of the vehicle, and wherein the at least one of the one or more weight measurements is adjusted based on both the first vertical acceleration and the second vertical acceleration.

5. The system of claim 1, wherein at least one of the plurality of accelerations comprises a horizontal acceleration of at least the portion of the vehicle.

6. The system of claim 1, wherein at least one of the plurality of accelerations comprises an angular acceleration of the vehicle.

7. The system of claim 6, wherein the processor is further configured to:
   determine a first vertical acceleration of a first portion of a chassis of the vehicle;
   determine a second vertical acceleration of a second portion of the chassis of the vehicle; and
   determine the angular acceleration based on the first vertical acceleration of the chassis and the second vertical acceleration of the chassis.

8. The system of claim 7, wherein the first portion of the chassis and the second portion of the chassis are at a same distance above a road upon which the weigh-in-motion scale is installed.

9. The system of claim 1, wherein the processor is configured to:
   determine an average weight of the vehicle based on the adjusted one or more weight measurements.

10. The system of claim 1, wherein the camera comprises a video camera, and wherein the images comprise one or more video frames.

11. A method comprising:
   capturing, with a camera, images of a vehicle as the vehicle goes over a weigh-in-motion scale;
   generating one or more weight measurements of the vehicle as the vehicle goes over the weigh-in-motion scale;
   determining a plurality of accelerations of at least a portion of the vehicle based at least in part on images of the vehicle captured by the camera, wherein each of the plurality of accelerations corresponds in time to a weight measurement of the one or more weight measurements; and
      adjusting each of the one or more weight measurements based on a corresponding acceleration.

12. The method of claim 11, wherein at least one of the plurality of accelerations comprises at least one of a vertical acceleration of a chassis of the vehicle or a vertical acceleration of a wheel of the vehicle.

13. The method of claim 11, wherein at least one of the plurality of accelerations comprises a first vertical acceleration of a chassis of the vehicle, and further comprising determining a second vertical acceleration of a wheel of the vehicle, wherein the at least one of the one or more weight measurements is adjusted based on both the first vertical acceleration and the second vertical acceleration.

14. The method of claim 11, further comprising determining an average weight of the vehicle based on the adjusted one or more weight measurements.

15. The method of claim 11, wherein at least one of the plurality of accelerations comprises an angular acceleration of the vehicle, and further comprising:
   determining a first vertical acceleration of a first portion of a chassis of the vehicle;
   determining a second vertical acceleration of a second portion of the chassis of the vehicle; and
   determining the angular acceleration based on the first vertical acceleration of the chassis and the second vertical acceleration of the chassis.

16. The method of claim 15, wherein the first portion of the chassis and the second portion of the chassis are separated from one another by at least one half of a length of the vehicle.

17. The method of claim 11, further comprising:
   determining a natural frequency of vehicle suspension of the vehicle; and
   triggering an alarm if the natural frequency of vehicle suspension falls outside of a predetermined range.

18. A non-transitory computer-readable medium having computer-readable instructions stored thereon, the computer-readable instructions comprising:
   instructions to capture images of a vehicle as the vehicle goes over a weigh-in-motion scale;
   instructions to generate one or more weight measurements of the vehicle as the vehicle goes over the weigh-in-motion scale;
   instructions to determine a plurality of accelerations of at least a portion of the vehicle based at least in part on the captured images of the vehicle, wherein each of the plurality of accelerations corresponds in time to a weight measurement of the one or more weight measurements; and
      instructions to adjust each of the one or more weight measurements based on a corresponding acceleration.

19. The non-transitory computer-readable medium of claim 18, wherein at least one of the plurality of accelerations comprises a first vertical acceleration of a chassis of the vehicle, and further comprising instructions to determine a second vertical acceleration of a wheel of the vehicle, wherein the at least one of the one or more weight measurements is adjusted based on both the first vertical acceleration and the second vertical acceleration.

20. The non-transitory computer-readable medium of claim 18, further comprising:
   instructions to determine an average weight of the vehicle based on the adjusted one or more weight measurements.

* * * * *